US011434155B2

(12) United States Patent
Syron et al.

(10) Patent No.: US 11,434,155 B2
(45) Date of Patent: Sep. 6, 2022

(54) LOW-PRESSURE, REVERSIBLE AIRLIFT MIXING SYSTEM FOR USE WITH A MEMBRANE AERATED BIOFILM REACTOR

(71) Applicant: OxyMem Limited, County Westmeath (IE)

(72) Inventors: Eoin Syron, County Wicklow (IE); Donal Lynch, County Laois (IE); Barry Heffernan, County Galway (IE); Wayne Byrne, County Kildare (IE); Mike Semmens, St. Paul, MN (US)

(73) Assignee: OxyMem Limited, County Westmeath (IE)

( * ) Notice: Subject to any disclaimer, the term of this patent is extended or adjusted under 35 U.S.C. 154(b) by 0 days.

(21) Appl. No.: 16/487,281

(22) PCT Filed: Feb. 20, 2018

(86) PCT No.: PCT/EP2018/054181
§ 371 (c)(1),
(2) Date: Aug. 20, 2019

(87) PCT Pub. No.: WO2018/150055
PCT Pub. Date: Aug. 23, 2018

(65) Prior Publication Data
US 2021/0139359 A1 May 13, 2021

Related U.S. Application Data
(60) Provisional application No. 62/461,139, filed on Feb. 20, 2017.

(30) Foreign Application Priority Data
Feb. 20, 2017 (EP) .................................... 17156862

(51) Int. Cl.
*B01D 63/04* (2006.01)
*C02F 3/22* (2006.01)
(Continued)

(52) U.S. Cl.
CPC ............ *C02F 3/223* (2013.01); *B01D 63/043* (2013.01); *B01D 63/046* (2013.01);
(Continued)

(58) Field of Classification Search
CPC ........ C02F 3/223; C02F 3/102; C02F 3/1273; C02F 3/1284; C02F 2203/006;
(Continued)

(56) References Cited

U.S. PATENT DOCUMENTS 6,237,898 B1 * 5/2001 Lafont .................. B01F 5/0206
261/77

FOREIGN PATENT DOCUMENTS

DE 10004863 A1 2/2001
DE 102011122695 A1 6/2013
(Continued)

OTHER PUBLICATIONS

Search Report issued in European Patent Application No. 17 156 862.9 dated Aug. 8, 2017.

*Primary Examiner* — Pranav N Patel
(74) *Attorney, Agent, or Firm* — Cesari & McKenna, LLP

(57) ABSTRACT

The invention relates to the design of an enclosure for a membrane aeration module, which incorporates a reversible, low-pressure, air-lift pump to encourage a vertical water flow through and between the membranes in the module. These enclosed membrane modules are suitable for use in membrane aerated biofilm reactors, which are used to treat water or wastewater.

16 Claims, 16 Drawing Sheets

(51) Int. Cl.
*C02F 3/10* (2006.01)
*C02F 3/12* (2006.01)
*B01F 23/232* (2022.01)
*B01F 101/00* (2022.01)

(52) U.S. Cl.
CPC ...... *B01F 23/232311* (2022.01); *C02F 3/102* (2013.01); *C02F 3/1273* (2013.01); *C02F 3/1284* (2013.01); *B01D 2313/04* (2013.01); *B01D 2313/20* (2013.01); *B01D 2313/243* (2013.01); *B01D 2313/26* (2013.01); *B01D 2317/04* (2013.01); *B01F 2101/305* (2022.01); *C02F 2203/006* (2013.01)

(58) Field of Classification Search
CPC ................ B01D 63/043; B01D 63/046; B01D 2313/243; B01D 2313/26; B01D 2317/04; B01F 3/04517; B01F 2215/0052; Y02W 10/10; C10G 70/00
See application file for complete search history.

(56) References Cited

FOREIGN PATENT DOCUMENTS

EP        2361367 B1    1/2013
WO    WO-2015132291 A1    9/2015

\* cited by examiner

LOW-PRESSURE, REVERSIBLE AIRLIFT MIXING SYSTEM FOR USE WITH A MEMBRANE AERATED BIOFILM REACTOR

CROSS REFERENCE TO RELATED APPLICATIONS

This application is the National Stage of International Application No. PCT/EP2018/054181, filed Feb. 20, 2018, which claims the benefit of U.S. Provisional Application No. 62/461,139, filed Feb. 20, 2017, and European Application No. 17 156 862.9, filed Feb. 20, 2017. The contents of all prior applications are hereby incorporated by reference in their entirety.

FIELD OF THE INVENTION

The invention relates to a low-pressure, airlift mixing system for use with a membrane aeration module in membrane supported biofilm reactors, which are used to treat water or wastewater. In particular, the invention relates to a low-pressure, airlift mixing system for use with a membrane aeration module in membrane supported biofilm reactors, which incorporate a low-pressure airlift pump to encourage good liquid flow through the membrane module when the modules are installed in a bioreactor or tank.

BACKGROUND TO THE INVENTION

Membrane Supported Biofilm Reactors (MSBRs) are bioreactors in which oxygen (or other gases) can be supplied to water or wastewater or to an attached biofilm via submerged, gas-permeable, membranes. The membranes may be hollow fibre, planar or spiral wound, and the membranes can be made of a hydrophobic porous or, alternatively, dense gas-permeable material (e.g. polydimethylsiloxane (PDMS), polymethylpentene (PMP)). The membranes are connected at one end to a gas supply and the other end can either be closed or open to allow an exhaust of the used gas. The membranes can be arranged into arrays or cassettes which can then be further connected to form modules. When the gas supplied to the membrane is oxygen in the form of air, oxygen-enriched air, or pure oxygen, the reactor is more commonly known as the Membrane Aerated Biofilm Reactor (MABR). The oxygen may be supplied to the one side of the membrane, which then allows oxygen to diffuse through the membrane and dissolve into the water on the other side, the water boundary layer over the membrane surface, or diffuse directly into a biofilm which is growing attached to the membrane. If the oxygen is not consumed in the biofilm it can continue to diffuse into the water around the biofilm. Oxygen flux across the membrane is proportional to the concentration gradient of oxygen across the membrane so that a high flux can be achieved by operating with high oxygen partial pressures inside the membrane and very low dissolved oxygen concentrations at the outside surface of the membrane. Other gases can be supplied in the same manner as oxygen and behave in the same way.

The oxygen-rich surface of the membranes, which is in contact with wastewater containing biodegradable organic and inorganic contaminants, provides an ideal environment for bacterial growth. Bacteria growing here receive the oxygen they require via diffusion through the membrane, and the substrates they need via diffusion from the surrounding wastewater. As a result, bacteria naturally colonize the surface of gas permeable membranes and a biofilm forms on the liquid side of the membrane.

The activity of this biofilm on the liquid side of the membrane has a profound influence on the flux of oxygen through the membrane as the bacteria consume oxygen and influence the concentration gradient across the membrane wall. Since the bacteria in the biofilm require both nutrients (substrate) from the wastewater and the oxygen from the membrane, the activity of the bacteria is greatest when both the dissolved oxygen concentration and substrate concentration are high. The activity of the bacteria may be limited either by limiting the supplying of oxygen, which is controlled by the rate of oxygen diffusion across the membrane, or by a limiting the supply of dissolved substrates, which is influenced by substrate concentration in the wastewater and the velocity of the wastewater over the membranes. The thickness of the biofilm, and the biological activity within the biofilm, control both the oxygen flux transfer across the membrane wall and the rate of substrate oxidation. As thicker biofilms develop aerobic, anoxic and anaerobic layers may form and the bacteria growing in these regions of the biofilm can remove both organic and inorganic contaminants (e.g. BOD and Nitrogen-based Pollutants).

To achieve high oxygen transfer rates and high substrate removal rates in an MABR, it is necessary to ensure that the supply of both oxygen to the membranes and substrate to the biofilm is controlled adequately, and that the biofilm is not allowed to become too thick, frequent scouring of the biofilm surface to remove the outer layers is commonly used to control the biofilm thickness. The scouring can vary in frequency and duration in order to remove a sufficient amount of the biofilm to ensure good performance. The hydraulic mixing conditions provided in the bioreactor must ensure that substrate is delivered efficiently to the outside of the biofilm.

Other gases and gas mixtures including but not limited to hydrogen, methane, and carbon dioxide can be supplied via gas permeable membranes, in the same manner as oxygen. The rate of transfer of these gases in an MSBR is controlled by the same factors which control oxygen transfer in an MABR. The presence of a biofilm, its thickness, and the local chemical concentrations of the species required by the bacteria within the biofilm for growth will all impact process performance.

Airlift pumps have been used in many applications for pumping water from one location to another when the pressure difference is low. Example applications include aquaculture, where airlift pumps are often used to move water from one tank to another.

Relevant prior art includes US Patent Publication No. 2007/0182033 which describes a bubble generator at the bottom of a vertical column, which when immersed in a tank filled with water can encourage good mixing throughout the tank. The design of the inverted siphon, which is incorporated into the bubble generator at the base of the column, is to generate an intermittent release of large bubbles. US Patent Publication No. 2016/0009578 incorporates a compartmentalized shroud with inverted siphons for aeration of an MABR, with an aerator having a separate air supply from the membranes. International Patent Publication No. WO 2016/209235 relates to the deployment of floating membrane modules. The claims highlight that the fibres need to be pressurized to a pressure that is greater than the hydrostatic pressure at the base of the modules. German Patent Application No. 100 04 863 describes an enclosure system comprising a plurality of panels used to enclose a membrane aeration module having hollow fibre membranes, and which induces air underneath the membranes to create an airlift system. This continuous upward flow around the membranes is required to ensure that the membranes are always vertical as the membranes are only attached to a manifold at one (lower) end.

It is an object of the present invention to overcome at least one of the above-mentioned problems.

SUMMARY OF THE INVENTION

In the MABR, the biofilm is naturally immobilized on an oxygen permeable membrane. Oxygen diffuses through the membrane into the biofilm where oxidation of pollutants, supplied at the biofilm-liquid interface, takes place. The oxygen supply rate is controlled by the intra-membrane oxygen partial pressure (a process parameter) and membrane surface area (a design parameter). However, in conventional wastewater treatment processes, oxygen is provided by pumping air to the bottom of a wastewater treatment tank. The air then enters the liquid via diffusers forming bubbles which rise up through the wastewater, transferring oxygen to the wastewater and also providing mixing in the treatment tank. As the MABR has no air being pumped to create bubbles which provide sufficient mixing, maintaining high performance rates over long-term trials has proven to be very difficult.

To ensure the MABR can become a more effective technology for wastewater treatment, there is a critical need to ensure that the reactor is well mixed and that there is effective contact between as much of the membrane-attached pollutant-degrading biofilm and the pollutant-rich wastewater to be treated. The Applicants have provided a solution for sufficiently mixing the wastewater fluid in a MABR treatment housing or tank while maintaining low energy requirements to mix the liquid in the MABR treatment housing.

According to the present invention, there is provided, as set out in the appended claims, an enclosure for use with a Membrane-Aerated Biofilm Reactor (MABR) of the type comprising a housing having an upper and lower headspace; an array of gas-permeable hollow fibre membranes arranged into cassettes disposed within the housing and extending from the upper headspace to the lower headspace, which incorporates a reversible, low-pressure, airlift mixing system to encourage a vertical wastewater flow over the membranes.

According to the present invention, there is provided, as set out in the appended claims, an enclosure for use with a Membrane-Aerated Biofilm Reactor (MABR) of the type comprising a housing having an upper and lower headspace; an array of gas-permeable hollow fibre membranes arranged into cassettes, with the cassettes being further arranged into a module, disposed within the housing and extending from the upper headspace to the lower headspace, which incorporates a reversible, low-pressure, airlift mixing system to encourage a vertical wastewater (liquid) flow over the membranes, wherein the membranes can be arranged vertically in the module, in which case the resulting liquid flow would be parallel to the membranes, or the membranes could be arranged horizontally in the module resulting in a cross-flow configuration.

An enclosure system for use with a membrane module of the type having an upper and lower headspace separated by an array of gas-permeable hollow fibre membrane cassettes, characterised in that the enclosure system comprises an airlift mixing system configured to transport liquid either from inside the membrane module to outside of the membrane module or from outside of the membrane module to inside the membrane module, and a plurality of panels configured to seal the membrane module to form an enclosed membrane module.

An enclosure system for use with a membrane module of the type having an upper and lower headspace separated by an array of gas-permeable hollow fibre membranes, characterised in that the enclosure system comprises:
   a plurality of panels configured to form an enclosed membrane module; and
   an airlift mixing system comprising an airlift channel and a first downcomer, which are in fluid communication with each other at their bottom, forming two vertical channels of a substantially U-shaped tube, which is open at both ends, and configured to transport liquid either from inside the membrane module to outside of the membrane module or from outside of the membrane module to inside the membrane module;
   wherein the enclosure is open at the top and bottom and which is encased within the enclosure system.

An enclosure system for use with a membrane module of the type having an upper and lower headspace separated by an array of gas-permeable hollow fibre membrane cassettes, characterised in that the enclosure system comprises an airlift mixing system configured to transport liquid either from inside the membrane module to outside of the membrane module or from outside of the membrane module to inside the membrane module, and a plurality of panels configured to seal the membrane module to form an enclosed membrane module, wherein the membrane module is open at the bottom and top of the module resulting in direct fluid communication with the liquid beneath the module with the panels extending above the surface of the liquid such that the flow of liquid entering from the bottom of the module must leave through the airlift mixing system, or that the flow of liquid entering the module through the airlift mixing system must leave through the open bottom of the module.

In one embodiment, the enclosure system further comprises a modular collar configured to attach to the enclosed membrane module and extend vertically above the surface of the liquid within the system. This increases the height of the upper headspace beyond the surface of the liquid. Alternatively, the plurality of panels extends vertically above the upper headspace and extend beyond the surface of the liquid within the system.

In one embodiment, the airlift mixing system comprises an airlift channel and a first downcomer. Preferably, the first downcomer and the airlift channel are in fluid communication with and are adjacent to each other, forming two vertical channels of a substantially U-shaped tube. Gas can then be injected into either side of this airlift mixing system creating an upward flow in the airlift channel and inducing a downward flow in the other channel of the U-shaped tube (the first downcomer). In this way flow is induced from one vertical channel of the U-shaped tube to the other, adjacent, vertical channel.

In one embodiment, the airlift mixing system contains a third vertical channel, giving the airlift mixing system a substantially W-shape, wherein the third vertical channel is a second downcomer and wherein one of the vertical channels is the air-lift channel, which is in fluid communication with the first and second downcomer.

In one embodiment, the enclosure system further comprises a vertical return channel, in which the vertical return channel is in fluid communication with the adjacent vertical channel of the substantially U-shaped tube or W-shaped tube.

Preferably, the substantially U-shaped tube (and W-shaped tube) is open at both ends, with one open end of the substantially U-shaped tube (or W-shaped tube) distal the vertical return channel forms a port with access to the inside of the enclosed membrane module. The other open end of the substantially U-shaped tube (or tubes of the substantially W-shaped tube), proximal the vertical return channel forms a port with access to outside of the enclosed membrane module.

In one embodiment, the vertical return channel is in fluid communication with either the airlift channel or the first and/or second downcomer and extends from the top of the enclosure to the bottom of the enclosure or to the top of the vertical return channel of the module directly below. Preferably, the vertical return channel is open to the environment outside of the enclosed membrane module and configured to provide a continuous channel to supply liquid from one location within the holding tank, or another holding tank or compartment within a treatment system, to either the substantially U-shaped tube or another location in the holding tank.

In one embodiment, the first downcomer is in fluid communication with liquid inside the enclosed membrane module and the airlift channel is in fluid communication with liquid outside of the enclosed membrane module or the vertical return channel.

In one embodiment, the first downcomer and second downcomer are in fluid communication with liquid inside the enclosed membrane module and the airlift channel is in fluid communication with liquid outside of the enclosed membrane module or the vertical return channel.

In one embodiment, the first and/or second downcomer is in fluid communication with liquid outside of the enclosed membrane module or the vertical return channel and the airlift channel is in fluid communication with liquid inside of the enclose membrane module.

In one embodiment, the airlift channel further comprises an air injection port configured to accept and deliver air into the airlift channel such that either the vertical channel of the U-shaped or W-shaped airlift mixing system can become the airlift channel and reverse the direction of the vertical flow of liquid within the enclosed membrane module. Preferably, the air that is supplied to the airlift channel is sourced from either exhaust air from the membranes, supplemental air from an external source, or both.

In one embodiment, the substantially U-shaped tube comprises an air injection port on both sides of the tube, configured to accept and deliver air into either vertical channel of the substantially U-shaped tube so that either vertical channel of the substantially U-shaped tube can become the airlift channel, such that the direction of the vertical flow of liquid within the enclosed membrane module can be reversed. Preferably, the air that is supplied to the airlift channel is sourced from either exhaust air from the membranes, supplemental air from an external source, or both.

In one embodiment, the air injection port is configured to release air continuously, in a pulsed or periodic manner, or a combination of both.

In one embodiment, the air injection port is connected to an air syphon configured to allow air to accumulate and be released periodically to the air injection port.

In one embodiment, the air injection port is configured to introduce air axially, radially, both axially and radially, or at an angle so as to induce turbulent water flow within the airlift channel.

In one embodiment, the air injection port is less than 3.0 m below the water surface within the modular collar of the framing system.

In one embodiment, the airlift mixing system is configured to control the level of liquid within the enclosed membrane module relative to the level of liquid outside the enclosed membrane module.

In one embodiment, at least one panel in a four-sided enclosed membrane module of the enclosure system is configured to each accommodate the airlift mixing system.

In one embodiment, at least two, three or all four panels in a four-sided enclosed membrane module of the enclosure system are each configured to accommodate the airlift mixing system.

In one embodiment, the airlift mixing system is configured to pump liquid in an upward or downward direction through the enclosed membrane module.

In one embodiment, the enclosure system further comprises a liquid flow distribution means in the headspace of the enclosed membrane module configured to provide uniform water flow throughout the enclosed membrane module. The liquid entering the enclosed membrane module from the airlift mixing system is distributed evenly along the surface of the liquid inside the module. Alternatively, the water leaving the enclosed membrane module and entering the first downcomer of the airlift mixing system is sourced evenly across the liquid surface of the enclosed membrane module. To achieve this, the system further comprises one or more weirs attached to the open end of the vertical channel in fluid communication with the inside of the enclosed membrane module, each weir having uniform v-notches or v-notches of varying size along the length of the weir or along the mouth of a bell-mouth water intake, also attached to the open end of the vertical channel in fluid communication with the inside of the enclosed membrane module.

In one embodiment, the enclosure system is modular, and where a plurality of enclosed membrane modules can be stacked one on top of the other.

In one embodiment, the lower gas manifold can be purged of liquid that may accumulate as a result of condensation or liquid leakage into the manifold. Preferably, a high air flow rate is delivered to the lower manifold either by increasing the airflow through the membranes, or by supplemental air supplied directly to the lower manifold, or a combination of both, so as to transport the accumulated liquid to either the airlift system or to the liquid surface.

In one embodiment, the enclosure system is retrofittable to an existing membrane module.

In one embodiment, there is also provided a Membrane-Aerated Biofilm Reactor (MABR) of the type comprising: a frame and having an upper and lower headspace; an array of membranes disposed within the frame and extending between the upper headspace to the lower headspace; characterised in that the MABR further comprises an enclosure system as described above.

In one embodiment, the air injection port is between 0.5 m to 3 m below the liquid surface within the modular collar of the framing system. Preferably, the air injection port is 0.5, 0.6, 0.7, 0.8, 0.9, 1.0, 1.1, 1.2, 1.3, 1.4, 1.5, 1.6, 1.7, 1.8, 1.9, 2., 2.1, 2.2, 2.3, 2.4, 2.5, 2.6, 2.7, 2.8, 2.9, or 3.0 m below the liquid surface within the modular collar of the framing system. Ideally, the air injection port is less than 2.5 m below the liquid surface within the modular collar of the framing system, that is, 0.5, 0.6, 0.7, 0.8, 0.9, 1.0, 1.1, 1.2, 1.3, 1.4, 1.5, 1.6, 1.7, 1.8, 1.9, 2., 2.1, 2.2, 2.3, 2.4, or 2.5 m below the liquid surface within the modular collar of the framing system.

In one embodiment, there is provided an enclosure system for use with a membrane module in membrane supported biofilm reactors, the membrane module of the type having an upper and lower headspace separated by an array of gas-permeable hollow fibre membrane cassettes secured in parallel in the module, wherein the cassettes are a linear arrangement of potted hollow fibre membranes, comprising an upper and lower manifold into which are potted a large number of hollow fibre membranes or a number of bunches of hollow fibre membranes, characterised in that the enclosure system comprises:

(i) a plurality of panels configured to seal the membrane module to form an enclosed membrane module which is open at the top and bottom but which is encased within the enclosure system;

(ii) a modular collar configured to attach vertically to the enclosed membrane module, increasing the height of the upper headspace;

(iii) a low-pressure airlift mixing system, which is integrated into at least one panel of said plurality of panels, which is configured to transport liquid either from inside the membrane module to outside of the membrane module, or vice versa, so that liquid is pumped in an upward or downward direction through the enclosed membrane module, to encourage good liquid flow through the enclosed membrane module when it is installed in a bioreactor tank, wherein the airlift mixing system comprises:

an airlift channel and a first downcomer, which are in fluid communication with each other at their bottom, forming two vertical channels of a substantially U-shaped tube which is open at both ends;

a vertical return channel having its top in fluid communication with the top of the channel of the substantially U-shaped tube proximal the vertical return channel;

an air injection port configured to accept and deliver air into the base of the airlift channel to induce upward flow of liquid above the air injection port in the airlift channel, causing a corresponding downward flow of liquid in the first downcomer;

wherein the open end of the U-shaped tube distal the vertical return channel forms a port with access to inside the enclosed membrane module, the open end of the U-shaped tube proximal the vertical return channel forms a port with access to outside of the enclosed membrane module and the lower end of the vertical return channel allows a fluid communication between the vertical return channel and the bottom of said bioreactor or tank.

In one embodiment, the airlift mixing system further comprises a third vertical channel, giving the airlift mixing system a substantially W-shape, wherein the third vertical channel is a second downcomer, and wherein one of the vertical channels is the air-lift channel, which is in fluid communication with the first and second downcomer.

Preferably, the vertical return channel is open to the environment outside of the enclosed membrane module and configured to provide a continuous channel to supply liquid from one location within the bioreactor or tank, or another holding tank or compartment within a treatment system.

Preferably, the first downcomer is in fluid communication with liquid outside the enclosed membrane module and the airlift channel is in fluid communication with liquid inside of the enclosed membrane module.

Preferably, the first and second downcomer is in fluid communication with liquid outside the enclosed membrane module and the airlift channel is in fluid communication with liquid inside of the enclosed membrane module.

Preferably, the air that is supplied to the airlift channel is sourced from either exhaust air from the membranes, supplemental air from an external source, or both.

Preferably, the air injection port is configured to release air continuously, in a pulsed or periodic manner, or a combination of both.

Preferably, the air injection port is connected to an air syphon configured to allow air to accumulate and be released periodically to the air injection port.

Preferably, the air injection port is configured to introduce air axially, radially, both axially and radially, or at an angle so as to induce turbulent liquid flow within the airlift channel.

Preferably, the air injection port is 3.0 m or less below the liquid surface within the modular collar of the enclosure system.

Preferably, the airlift mixing system is configured to control the level of liquid within the enclosed membrane module relative to the level of liquid outside the enclosed membrane module.

Preferably, at least one of the panels in a four-sided enclosed membrane module are configured to each accommodate the airlift mixing system. Preferably, at least two, three or all panels in a four-sided enclosed membrane module are each configured to accommodate the airlift mixing system.

Preferably, the system further comprises a liquid flow distribution means in the headspace of the enclosed membrane module configured to provide uniform liquid flow through the enclosed membrane module.

Preferably, the enclosure system is modular, and where a plurality of enclosed membrane modules can be stacked one on top of the other.

Preferably, the lower gas manifold can be purged of liquid, such as water, that may accumulate as a result of condensation or leakage. A high air flow rate is delivered to the lower manifold either by increasing the airflow through the membranes, or by supplemental air supplied directly to the lower manifold, or a combination of both, so as to transport the accumulated liquid to either the airlift mixing system or to the liquid surface.

Preferably, the enclosure system is retrofittable to an existing membrane module.

In one embodiment, there is provided a membrane aeration module of the type comprising: a frame and an upper and lower headspace separated by an array of gas-permeable hollow fibre membrane cassettes fitted in parallel in the fame in the membrane aeration module, wherein the cassettes are in a linear arrangement of potted hollow fibre membranes, comprising an upper and lower manifold into which are potted a large number of hollow fibre membranes or a number of bunches of hollow fibre membranes.

In the specification, the term "Membrane Aerated Biofilm Reactor (MABR)" should be understood to mean a Membrane Supported Biofilm Reactor (MSBR) for treating wastewater liquids to remove carbonaceous pollutant removal, nitrify/denitrify the pollutants, and/or perform xenobiotic biotreatment of the wastewater constituents. Soluble organic compounds in the liquid are supplied to the biofilm from the biofilm-liquid interface, whereas gas supply to the biofilm is from the biofilm-membrane interface (by diffusing through the membrane). Typically, a biofilm consisting of a heterogeneous population of bacteria (generally including nitrifying, denitrifying, and heterotrophic, bacteria) grows on the fluid phase side of the membrane.

MABRs can achieve bubble-less aeration and high oxygen utilization efficiency (up to 100%) and the biofilm can be separated into aerobic/anoxic/anaerobic zones to simultaneously achieve removal of carbonaceous organic pollutants, as well as nitrification and denitrification in a single biofilm. An example of MABRs of the type comprising a lumen containing a gas phase, a liquid phase, and a gas permeable membrane providing an interface between the gas and liquid phases are described by European Patent No. 2 361 367 (University College Dublin).

In the specification, the term "upper headspace" should be understood to mean an enclosed upper membrane-free zone above the membrane cassettes, and the term "lower headspace" should be understood to mean a lower membrane-free zone below the membrane cassettes and in fluid communication with the water in a tank.

In the specification, the term "bunch of membranes" should be understood to mean a collection of from 10 to 100,000, 10 to 10,000, 10 to 1,000 or 10 to 100 gas-permeable, hollow membrane fibres, which are potted at either end into a circular bunch or a shaped element such that the ends of the fibres are open. The membranes can be arranged vertically in the MABR, in which case the resulting liquid flow would be parallel to the membranes, or the membranes could be arranged horizontally in the MABR, resulting in a cross-flow configuration.

In the specification, the term "shaped element" or "shaped connector" should be understood to mean an element which gives the bunch of membranes a particular shape (e.g. chevron shaped, cross-shaped, linear, square, rectangular, triangular, hexagonal, other polygonal or circular cross-section etc.). This provides a connector end that can be glued into, or otherwise secured in a gas-tight manner to, the upper or lower manifolds, which then become known as potted membranes.

In the specification, the terms "upper manifold" and "lower manifold" should be understood to mean gas manifolds which are equipped with ports designed to receive the shaped element connectors, which are attached to each end of the bunches of membranes. In addition, bunches of membranes may be potted directly into the upper and lower gas manifolds to form a continuous bunch of membranes stretching from one end of the manifold to the other (see FIG. 1B). When oriented vertically the top manifold is referred to as the upper manifold and the bottom manifold is referred to as the lower manifold. The upper and lower manifolds are in fluid communication with the internal architecture of all the hollow fibres such that air/gas can flow from the inside of the upper manifold, through the hollow fibres to the lower manifold, or vice versa.

In the specification, the term "cassette" should be understood to mean a linear arrangement of potted hollow fibre membranes, comprising an upper and lower manifold into which are potted a large number of hollow fibre membranes or a number of bunches of hollow fibre membranes. A cassette is illustrated in FIGS. 1A and 1B. If gas is supplied to the upper manifold, then this manifold serves as the inlet manifold and the gas will flow downwards within the hollow fibres and into the lower manifold, which will serve as the exhaust gas manifold. If, however, the gas is supplied to the lower manifold, then this manifold serves as the inlet manifold and the gas will flow upwards within the hollow fibres and into the upper manifold, which will serve as the exhaust gas manifold.

In the specification, the term "membrane module" or "Membrane Aerated Biofilm Reactor (MABR)" should be understood to mean a device into which a number (2-1,000, 2-900, 2-800, 2-750, 2-700, 2-650, 2-600, 2-550, 2-500, 2-450, 2-400, 2-350, 2-300, 2-250, 2-200, 2-150, 2-100, 2-50) of cassettes consisting of hollow fibre membranes can be secured in parallel. The cassettes are generally secured in a frame.

In the specification, the term "frame" in the context of use with a membrane module should be understood to mean a housing that is capable of receiving 2-1,000, 2-900, 2-800, 2-750, 2-700, 2-650, 2-600, 2-55, 2-500, 2-450, 2-400, 2-350, 2-300, 2-250, 2-200, 2-150, 2-100, 2-50 cassettes and hold them in parallel with a well-defined and even spacing between adjacent cassettes. Preferably, 2-200 cassettes are typically arranged within a frame. A frame is illustrated in FIG. 1C.

In the specification, the term "enclosed membrane module" should be understood to mean a membrane module which is open at the top and bottom but which is encased with an enclosure system as illustrated in FIG. 2.

In the specification, the term "enclosure system" or "modular enclosure system" should be understood to mean a series of panels that can be attached to the frame of a membrane module (see FIG. 2) or can be arranged to form an enclosed frame for a membrane module. The panels of the enclosure system may incorporate enclosed channels, or conduits for water flow. When water is encouraged to flow through these channels or conduits, they induce a vertical water velocity past the membranes in the enclosed membrane module. The enclosure can be modular in nature and designed to permit the stacking of enclosed membrane modules to form a continuous enclosed volume consisting of several levels of membrane cassettes. The panels may also extend vertically above the upper manifold and extending beyond the surface of the water within the system. This arrangement separates the water inside the enclosed membrane module from the water outside of the enclosed membrane module.

In specification, the term "enclosed channel" should be understood to mean a fully enclosed conduit or pipe that is either moulded to or attached to the panels forming the enclosure of the invention. The enclosed channel may have a square, rectangular, triangular, hexagonal, other polygonal or circular cross-section.

In the specification, the term "modular collar" should be understood to mean a tightly fitted enclosure that extends the height of the panels of the enclosed membrane module (encased by the enclosure of the invention) vertically by 100 mm to 500 mm above, and preferably 100 mm-1000 mm above the upper manifold and extending beyond the surface of the liquid. It separates the liquid inside the enclosed membrane module from the liquid outside of the enclosed membrane module.

In the specification, the term "downcomer" should be understood to mean a vertical, enclosed channel that is moulded into, or attached to, a panel of the enclosed membrane module. The top of this downcomer is located beneath the surface of the liquid, and liquid within the downcomer flows in a downwards direction.

In the specification, the term "airlift channel" should be understood to mean a vertical enclosed channel that is normally filled with liquid, installed below the surface of the liquid, such as wastewater, or protruding above the surface of the liquid. Air is introduced continuously, or in a pulsatile fashion, through the walls of a vertical, enclosed channel at a point that is approximately 0.5 m to 3 m below the liquid (wastewater) surface level in the bioreactor. The rising bubbles, formed and released within the enclosed channel rise and encourage an upwards flow of liquid (wastewater)

within the enclosed channel. The air may be injected into the airlift channel using a variety of injection methods including: radial, axial, dual radial and axial, and swirl, under both steady and pulsating injection modes. In the steady air injection regime, the results have shown that dual injection outperforms axial and radial injections, and that the volumetric flow rate of liquid was improved by pulsatile air injection. Pulsatile air injection may be affected by either stopping and starting the air flow, either by means of solenoid valves or by the use of an air syphon. The design of a pulsatile air injection method using an air syphon is described in detail in U.S. Pat. No. 6,162,020.

In the specification, the term "substantially U-shaped tube" should be understood to mean two vertically aligned enclosed channels, fabricated into, or attached to a sidewall of the enclosure system: one channel being a downcomer and one channel being an airlift channel. The two vertical channels are connected by a U-bend, or a substantially U-shaped bend connector, at the base. One of the upper ends of the substantially U-shaped tube is open towards the enclosed module (within the modular collar and usually the downcomer, but it can also be the airlift channel) and the other upper end of the substantially U-shaped tube is open to the area outside of the modular collar (usually the airlift channel, but it can also be the downcomer).

In the specification, the term "substantially W-shaped tube" should be understood to mean three vertically aligned enclosed channels, fabricated into, or attached to a sidewall of the enclosure system: two channels being a first and second downcomer and one channel being an airlift channel. The three vertical channels are aligned adjacent to each other and connected by a U-bend, or a substantially U-shaped bend connector, at the base. One of the upper ends of the substantially W-shaped tube is open towards the enclosed module (within the modular collar and is usually considered to be the airlift channel). The other upper ends of the substantially W-shaped tube are open to the area outside of the modular collar (usually considered to be the first and second downcomer channels). The order of the airlift channel and first and second downcomer as they appear in the W-shaped tube can vary according to the user's preference.

In the specification, the term "airlift pump" should be understood to mean a system comprising a substantially U-shaped tube with air being injected into the base of one of the vertical channels of the substantially U-shaped tube to induce a flow of liquid through the substantially U-shaped tube. The rising air bubbles will induce an upwards flow of liquid above the point of air injection in the airlift channel, causing a corresponding downflow of liquid in the other vertical channel of the substantially U-shaped tube (the first downcomer). A similar arrangement can be made for a system having a substantially W-shaped tube, with air being injected into the base of one of the vertical channels of the substantially W-shaped tube to induce a flow of liquid through the substantially W-shaped tube. The rising air bubbles will induce an upwards flow of liquid above the point of air injection in the airlift channel, causing a corresponding downflow of liquid in one or both of the other vertical channels of the substantially W-shaped tube (the first and/or second downcomer).

In the specification, the term "air syphon" should be understood to mean a syphon of the type described in U.S. Pat. No. 6,162,020 which incorporates an air reservoir that is filled continuously with air but which discharges the air to an injection port in the airlift channel periodically when the volume of air is sufficient to create a syphon.

In the specification, the term "vertical return channel" should be understood to mean a continuous channel from the top of an enclosed membrane module to the base of the enclosed membrane module, or to the base of the lowest enclosed membrane module if the modules are stacked. The vertical return channel allows liquid to flow between the top of the enclosed membrane module to the base of the tank in which the modules are installed. The direction of flow will depend upon the operating mode of the airlift pump. Alternatively, it allows treated liquid from the top of the enclosed membrane module to be pumped to the bottom of the tank through the airlift pump.

In the specification, the term "tank", "holding tank" or "bioreactor" should be understood to mean a large holding vessel, which is supplied with liquid (water or wastewater) and is used to hold the water or wastewater while it is being treated. One or more enclosed membrane modules may be installed within the tank to create a Membrane Aerated Biofilm Reactor (MABR).

In the specification, the term "liquid" should be understood to mean "water" or "wastewater", which should be understood to mean any water that has been adversely affected in quality by anthropogenic influence. Wastewater can originate from a combination of domestic (for example, sewage), industrial, commercial or agricultural activities, surface runoff or storm-water, and from sewer inflow or infiltration.

BRIEF DESCRIPTION OF THE DRAWINGS

The invention will be more clearly understood from the following description of an embodiment thereof, given by way of example only, with reference to the accompanying drawings, in which:

FIG. 1A illustrates a cassette of the prior art comprising shaped elements with individual bundles of fibres, while

In FIG. 4A, the intake port of the airlift mixing system is located within the modular collar and draws liquid from within the enclosed membrane module. The airlift channel discharges liquid outside of the modular collar and liquid may flow downwards through the return channel to the base of the tank within which the entire enclosed membrane module is located. In FIG. 4B, the air injection port is located in the enclosed channel of the other side of the U-shaped tube that forms the airlift mixing system (now the upward flowing channel), and the discharge point of the airlift channel is now located within the modular collar and delivers liquid to the upper headspace above the membranes thus creating a higher liquid level within the enclosed module and forcing a downward velocity of liquid. The liquid within the tank is now drawn up from the bottom of the tank through the return channel or in via opening at point 12. The intake port of the first downcomer and return channel is now located outside of enclosed membrane module.

FIG. 6A and FIG. 6B are operating in the modes shown in FIGS. 4A and 4B respectively.

DETAILED DESCRIPTION OF THE DRAWINGS

The invention described herein provides low shear conditions, and the effective delivery of substrates to the biofilms growing on membranes, by providing a low pressure, airlift mixing system, which is integrated into a membrane module enclosed by the enclosure system of the invention and that surrounds the membranes.

Typically, airlift channels are feasible if the pressure against which the water must be pumped is less than about 300 mm of water. Pressure drops of more than 300 mm of water reduce the efficiency of airlift pumping and the water flow rate drops dramatically. For this reason, it is important that the head losses and pressure drops within the airlift mixing system itself are minimized. The size of the pipes or channels used for the airlift mixing system must be selected to minimize pressure losses and maximize airflow rates.

The flow rate of liquid that can be achieved in an airlift mixing system is a function of the air flow rate, the depth of the air injection port and the size (effective diameter) of the airlift channel. Typically, the liquid flow rate increases with air flow rate and the depth of the air injection port. Since energy consumption is a major environmental concern and operating cost associated with wastewater treatment, it is important to minimize the energy requirements for mixing and aeration. This can be accomplished by using the air supplied to the membranes for both oxygen transfer and mixing. Also, by using an airlift mixing system with a shallow depth for the air injection port, the air pressure required within the membranes can be kept low and energy consumption can be minimized. The liquid flow rate through an enclosed membrane module can thus be controlled by the design and operating conditions of the airlift mixing system, while the operating air pressure is independent of the depth of submergence of the membranes in stacked membrane modules and only dependant on the depth of the air injection into the airlift mixing system.

Figure 1A:
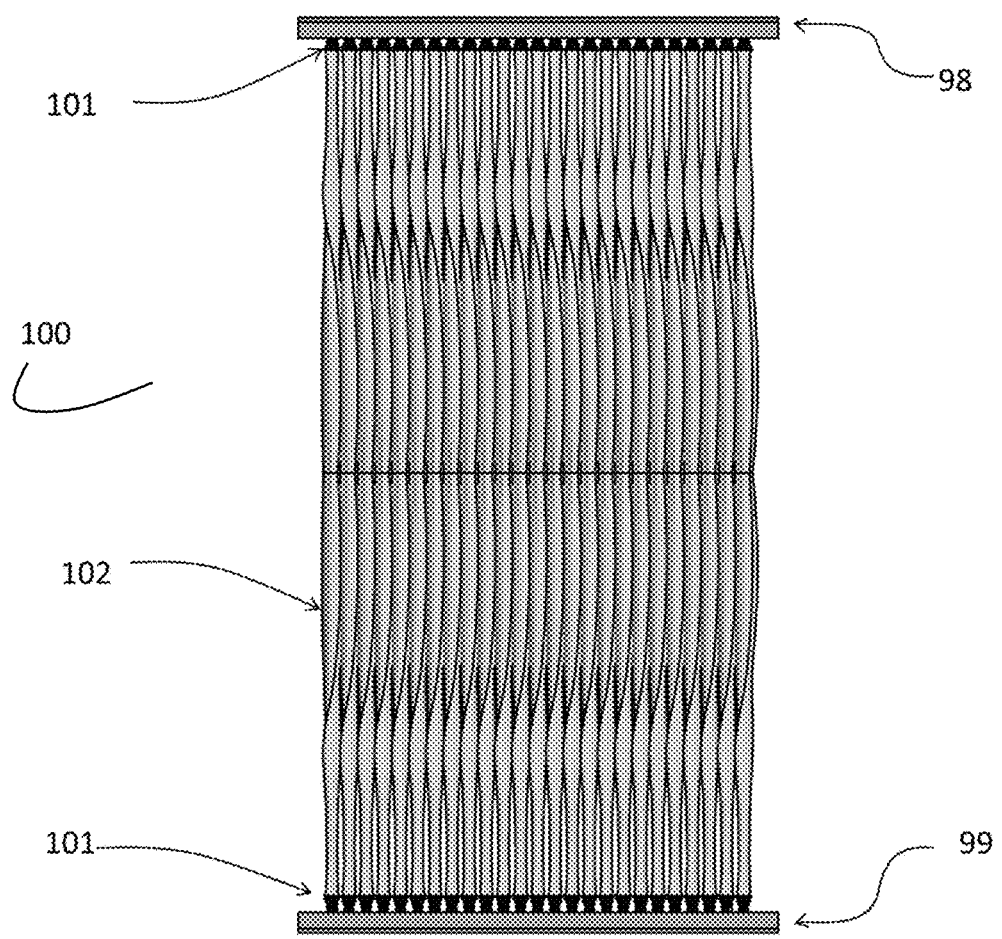
Figure 1B:
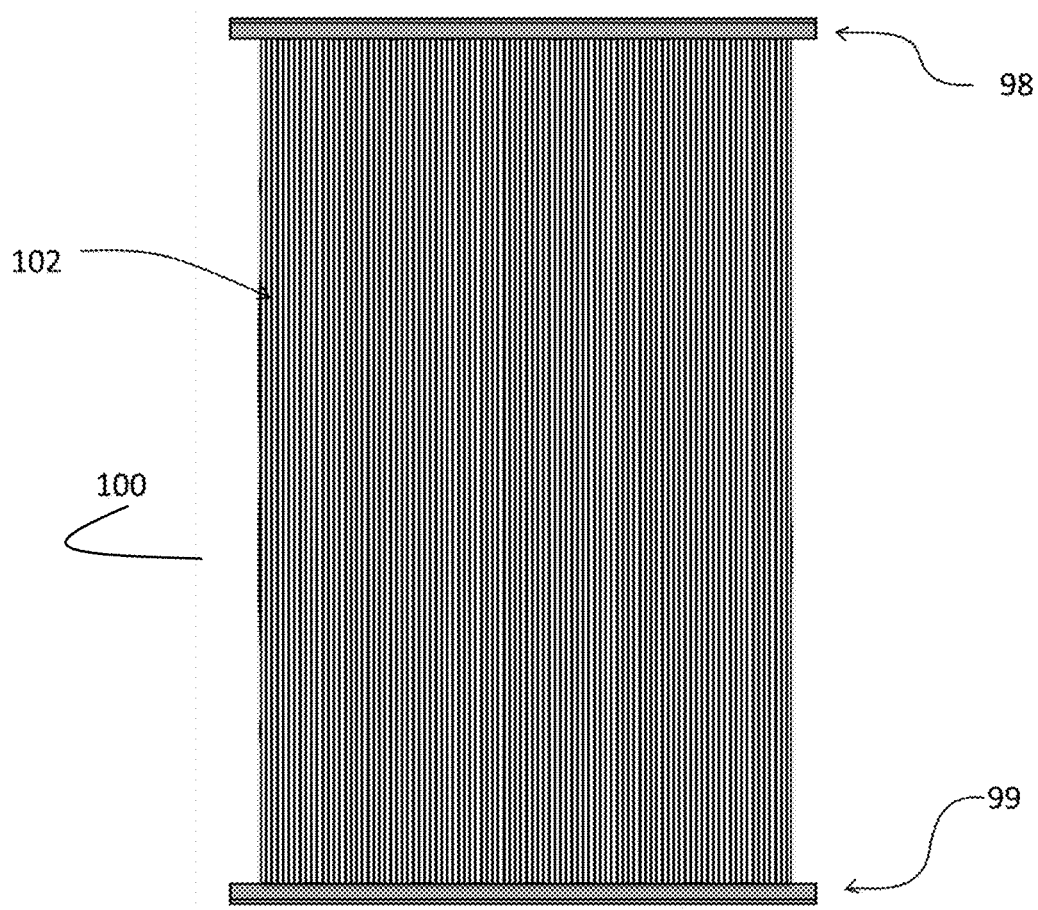
FIG. 1B illustrates a cassette of the prior art in which the membranes are potted continuously directly into the upper and lower manifolds and which require no shaped element connectors.
Figure 1C:
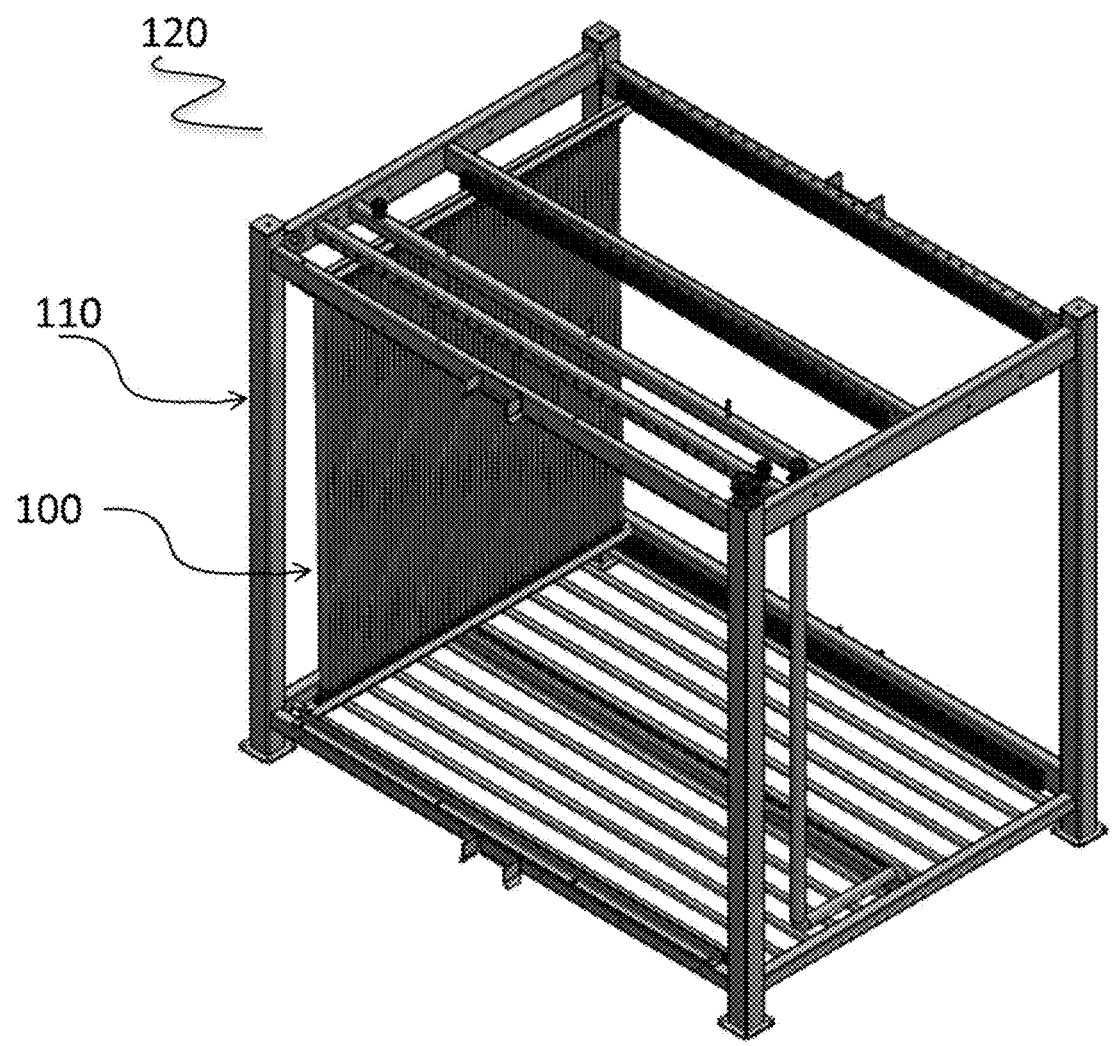
FIG. 1C illustrates an elevation view of the membrane cassettes within a metal frame of the prior art that form a membrane module.

Referring now to the figures, where FIG. 1 illustrates a cassette 100 comprising shaped element connectors 101 with individual bundles of fibres 102, potted into upper 98 and lower 99 manifolds while FIG. 1B illustrates a cassette 100 in which the membrane fibres 102 are potted continuously and directly into the upper 98 and lower 99 manifolds and which require no shaped element connectors 101. FIG. 1C illustrates a view of membrane cassettes 100, being assembled into a membrane module 120 of the prior art. The membrane module 120 comprises a frame 110 into which the cassettes 100 can be fitted.

Figure 2A:
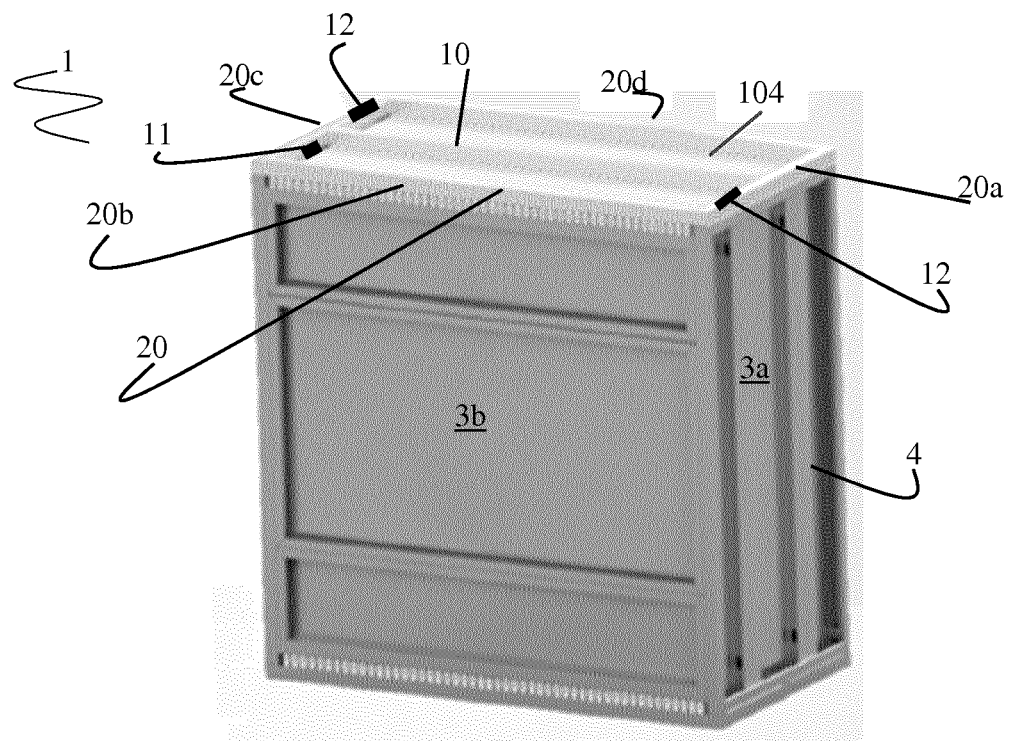
FIG. 2A illustrates a side elevation view of an enclosed membrane module of the present invention and FIG. 2B illustrates a side elevation view of the enclosed membrane module of the present invention, showing an integrated airlift system comprising an airlift pump, a first downcomer and a return channel. These membrane modules are completely surrounded and protected by the enclosure's panels, but are open at the top and the bottom.
Figure 2B:
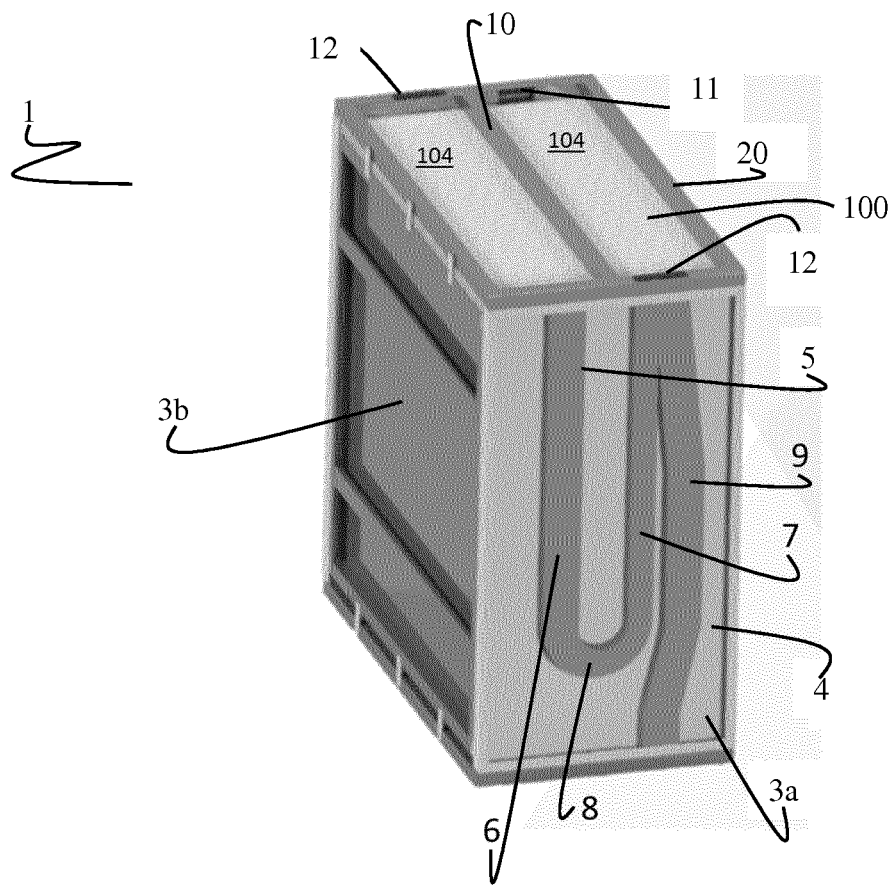

Referring now to FIG. 2, where a general embodiment of the present invention is illustrated. Specifically, FIG. 2A illustrates a side elevation view of a membrane module enclosed by the enclosure system of the present invention to form an enclosed membrane module, with the enclosed membrane module generally referred to by reference numeral 1. The enclosed membrane module 1 comprises panels 3a, 3b, 3c, 3d which enclose the membrane module 120, and comprise an airlift mixing system 4 (see FIG. 2B). When in use with the membrane module 120, the panels 3a, 3b, 3c, 3d of the enclosed membrane module 1 completely surround and encloses the cassettes 100, but the enclosed membrane module 1 is open at the top and the bottom. FIG. 2B illustrates a side elevation view of the enclosed membrane module 1, showing the airlift mixing system 4. In the illustrated embodiment, the airlift mixing system 4 is integrated within the panels 3a, 3c. The airlift mixing system 4 could also be integrated within panels 3b, 3d. The airlift mixing system 4 comprises a series of enclosed tubes that form a substantially U-shaped tube 5 with a vertical tube attached thereto. Specifically, the substantially U-shaped tube 5 comprises a first downcomer 6 connected to an airlift channel 7 by a u-bend 8. Additionally, the system may comprise a return channel 9. The enclosed membrane module 1 is shown to further comprise a reinforcing bar 10 and ports 11, 12. The reinforcing bar 10 extends from panel 3a to the opposite panel 3c. A modular collar 20 is attached to the top of the enclosed membrane module 1, and is configured to separate the ports 11 and 12. When water is flowing from an upper headspace 104 to a lower headspace 106, the port 12 provides fluid communication between liquid in the tank and the upper headspace 104 through the substantially U-shaped tube 5. When liquid is flowing from the lower headspace 106 (or from the bottom of a holding tank) to the upper headspace 104, the port 11 provides fluid communication between the upper headspace and the liquid in the bulk tank through the substantially U-shaped tube 5. The port 12 allows for air injected into the airlift channel 7 to escape to atmosphere, and not to become entrained in the liquid flowing downward in the return channel 9 to the bottom of the tank.

Figure 2C:
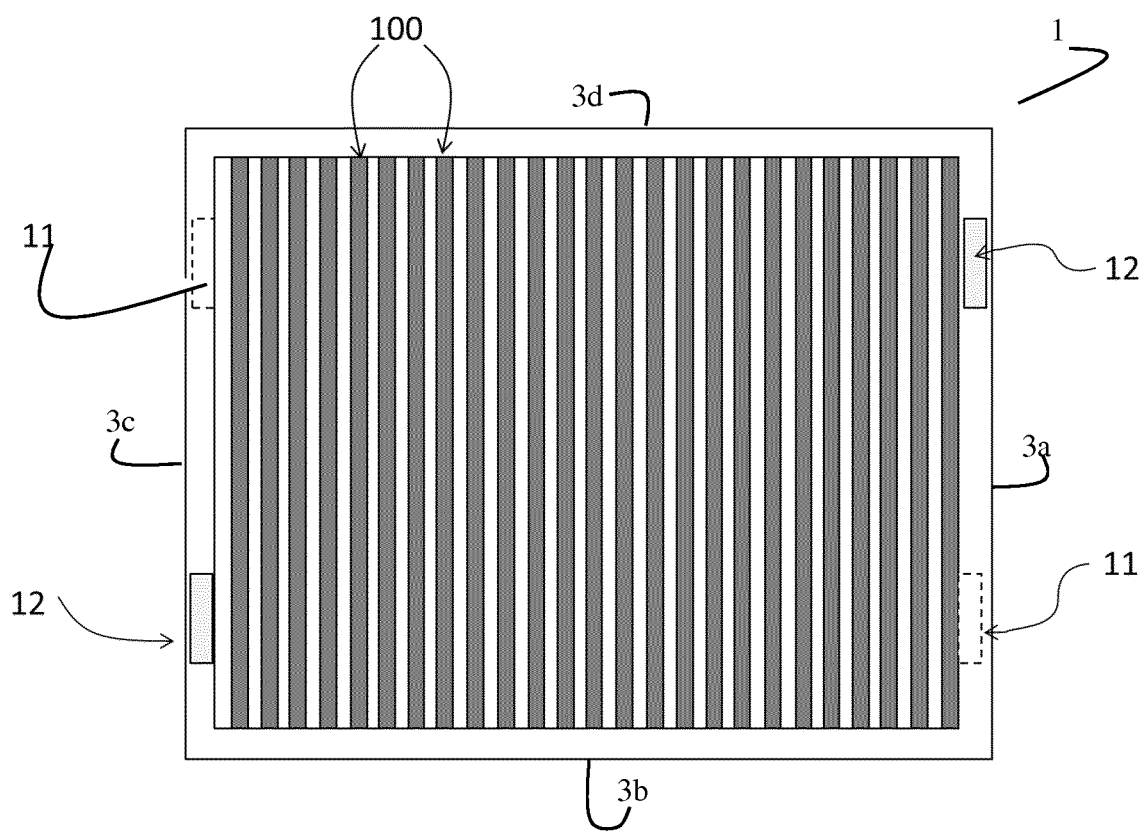
FIG. 2C illustrates a plan view of an enclosed membrane module of present invention.

FIG. 2C illustrates a plan view of an enclosed membrane module 1. As illustrated, the upper headspace 104 of the enclosed membrane module 1 and a series of parallel membrane cassettes 100 are visible. The cassettes 100 are arranged in parallel that provide space between each cassette 100 to allow liquid to flow there between.

Figure 3A:
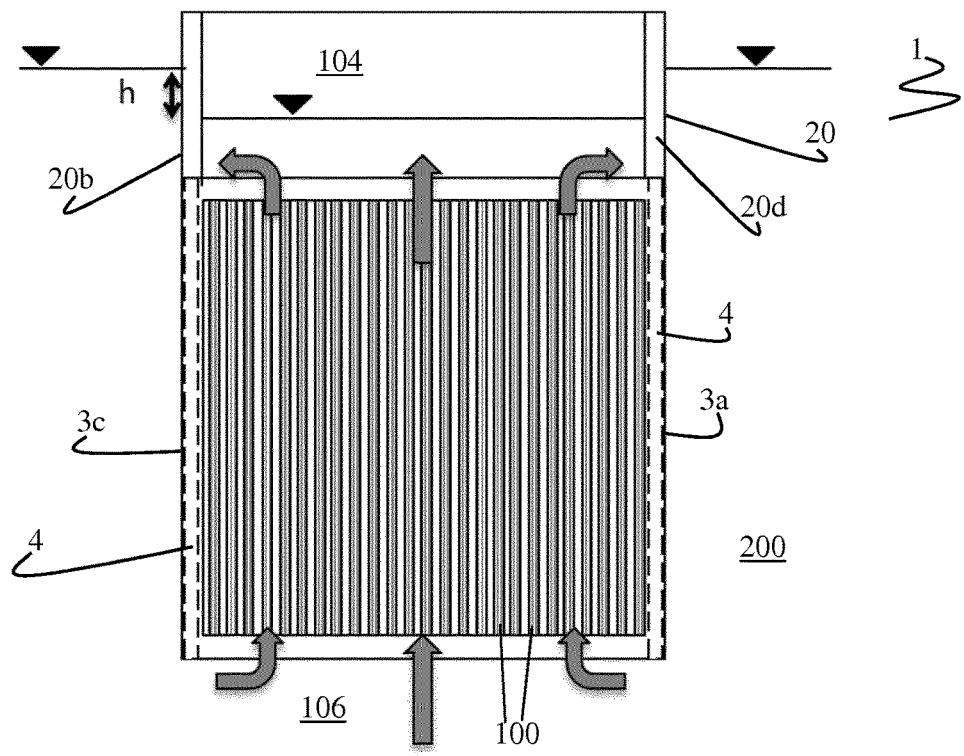
FIG. 3A illustrates a side elevation of an enclosed membrane module of the present invention, which has been fitted with a modular collar and installed in a holding tank or bioreactor (not shown).
Figure 3B:
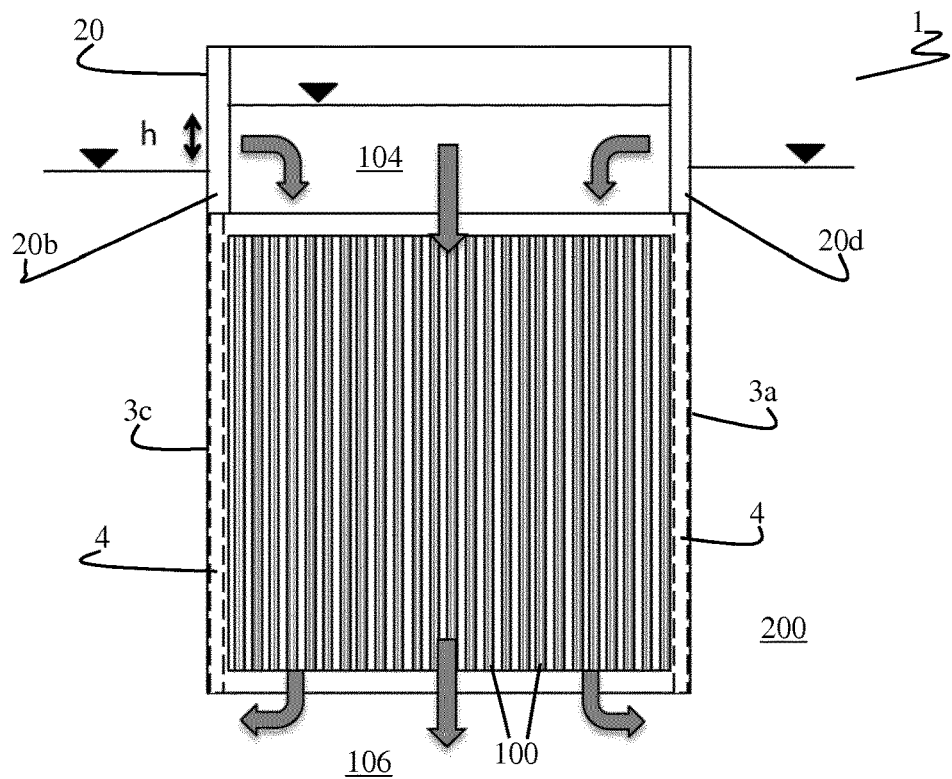
FIG. 3B shows that if the liquid (water) level within the modular collar is higher than the surrounding liquid (water) level in the tank, the direction of flow is reversed when compared to the direction of flow in FIG. 3A.

FIG. 3A illustrates a side elevation of an enclosed membrane module 1, which has been fitted with the modular collar 20 and installed in a holding tank or bioreactor 200. When the level of liquid inside the modular collar 20 is below the liquid level in the surrounding tank 200, liquid will flow upwards through the enclosed membrane module 1 to equalize the water levels inside and outside of the tank 200. The greater the difference in liquid level between the outside and inside of the modular collar 20 (h mm of liquid as shown in FIG. 3A), the greater the induced liquid velocity through the enclosed membrane module 1. FIG. 3B shows that if the liquid level within the modular collar 20 is higher than the surrounding liquid level in the tank 200, the direction of flow is reversed. Again, the greater the difference in liquid levels (h), the greater the liquid velocity created within the enclosed membrane module. The arrows in FIGS. 3A and 3B illustrate the direction of liquid flow induced by the changes in levels of liquid within the membrane module 120 and the tank 200.

Figure 4A:
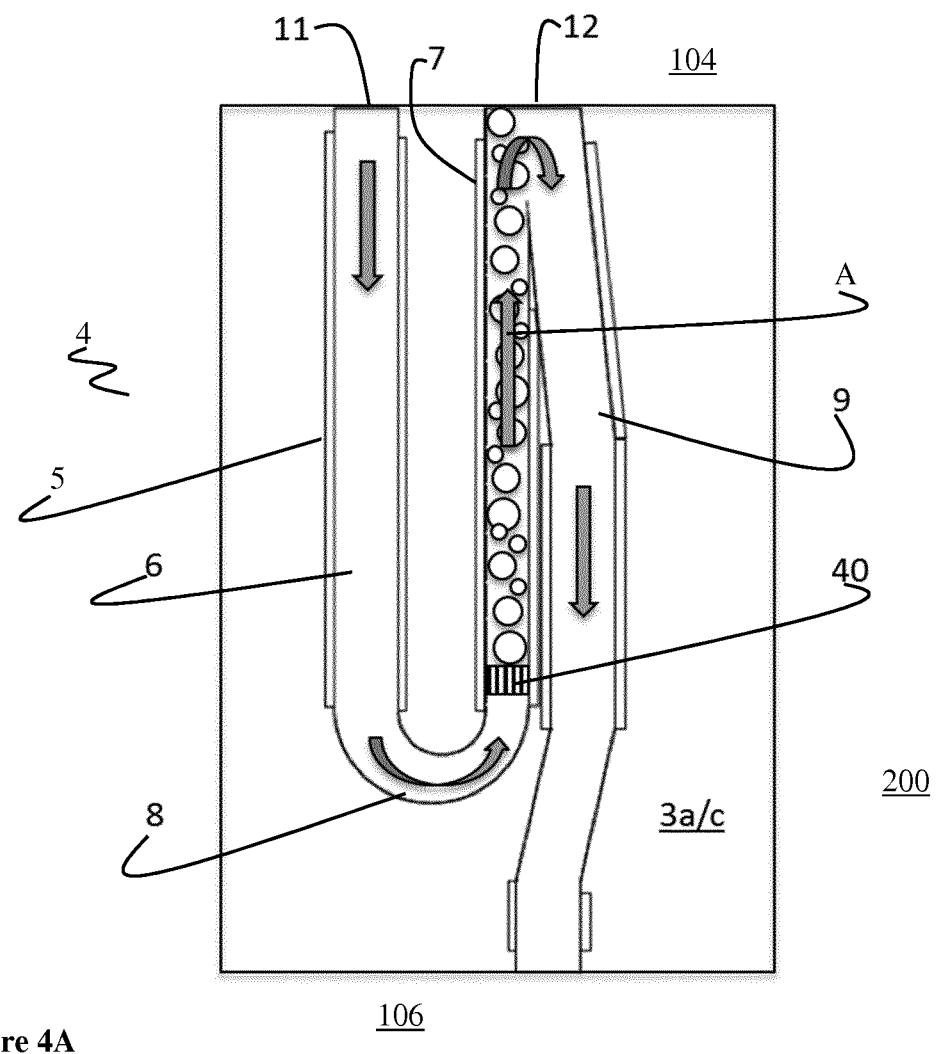
FIG. 4A and FIG. 4B illustrate how the airlift mixing system provided on a panel of the enclosure system of the invention that can operate as an airlift pump. The airlift mixing system is capable of providing a flow from the upper headspace to the tank or a flow from the tank to the upper headspace, thus inducing an upward or a downward liquid flow, respectively, within the enclosed membrane module of the present invention.
Figure 4B:
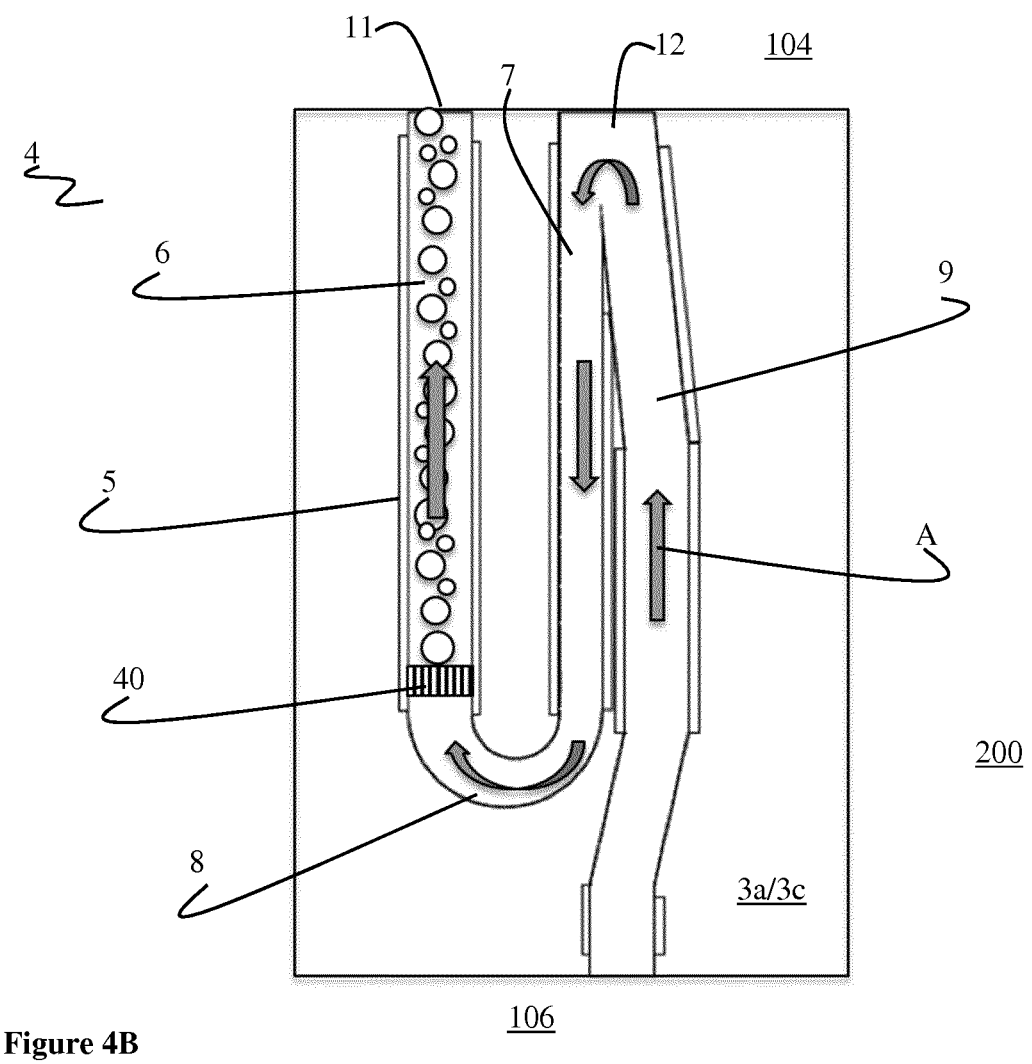

FIG. 4A and FIG. 4B illustrates the detail of the airlift mixing system 4 within a panel 3a, 3b, 3c, 3d that can operate as an airlift pump, and which is capable of providing either an upward or a downward liquid flow respectively within the enclosed membrane module 1. The airlift mixing system 4 comprises the enclosed substantially U-shaped tube 5 connected to the vertical return channel 9 at one side thereof. In FIG. 4A, the configuration of the channels of the airlift mixing system 4 is shown which illustrate movement of liquid from the bottom of the tank 200 to the top of the enclosed membrane module 1. In this instance, the outer enclosed channel of the airlift mixing system 4 acts as a first downcomer 6, which receives liquid from inside the modular collar 20 (from the upper headspace 104) and acts to reduce the liquid level within the modular collar 20 relative to the liquid level within the tank 200. Air is injected into a middle-enclosed channel, here called the airlift pump 7, via an air injection port 40. The rising bubbles produced by the air injection port 40 induce a vertical liquid velocity flow (indicated by Arrow A), which moves water as illustrated by the arrows shown. At the top of the enclosed membrane module 1, the airlift pump 7 and the return channel 9 merge outside of the enclosed membrane module 1, the air bubbles are vented at the liquid surface and the liquid flows downwards through the return channel 9 to the base of the tank 200. In FIG. 4B, the configuration of the channels of the airlift mixing system 4 is shown which illustrate movement of liquid from the upper manifold 104 within the enclosed membrane module 1 downwards through the cassettes 100 to the bottom of the tank 200. The air injection port 40 is switched to the outer channel of the substantially U-shaped tube 5 and becomes the airlift pump 7, while the inner channel of the substantially U-shaped tube 5 becomes the first downcomer 6 and is physically connected to the return channel 9. The airlift channel 7 supplies liquid to the inside of the modular collar 20 and upper manifold 104, causing an increase in water level above the membrane module 120 relative to the liquid outside of the modular collar 20 in the tank 200. In this operating mode, liquid is drawn from the bottom of the tank 200 via the return channel 9 as illustrated. The arrows A in FIG. 4B illustrate the direction of liquid flow induced by the airlift channel 7. The liquid level in the modular collar 20 covering the enclosed membrane module 1 is separated from the liquid outside in the tank 200 in which the module is immersed due to the seal created by the enclosed membrane module 1, such that the airlift mixing system 4 may raise or lower the liquid level covering the membrane module 1 relative to the liquid level in the tank 200.

Figure 5A:
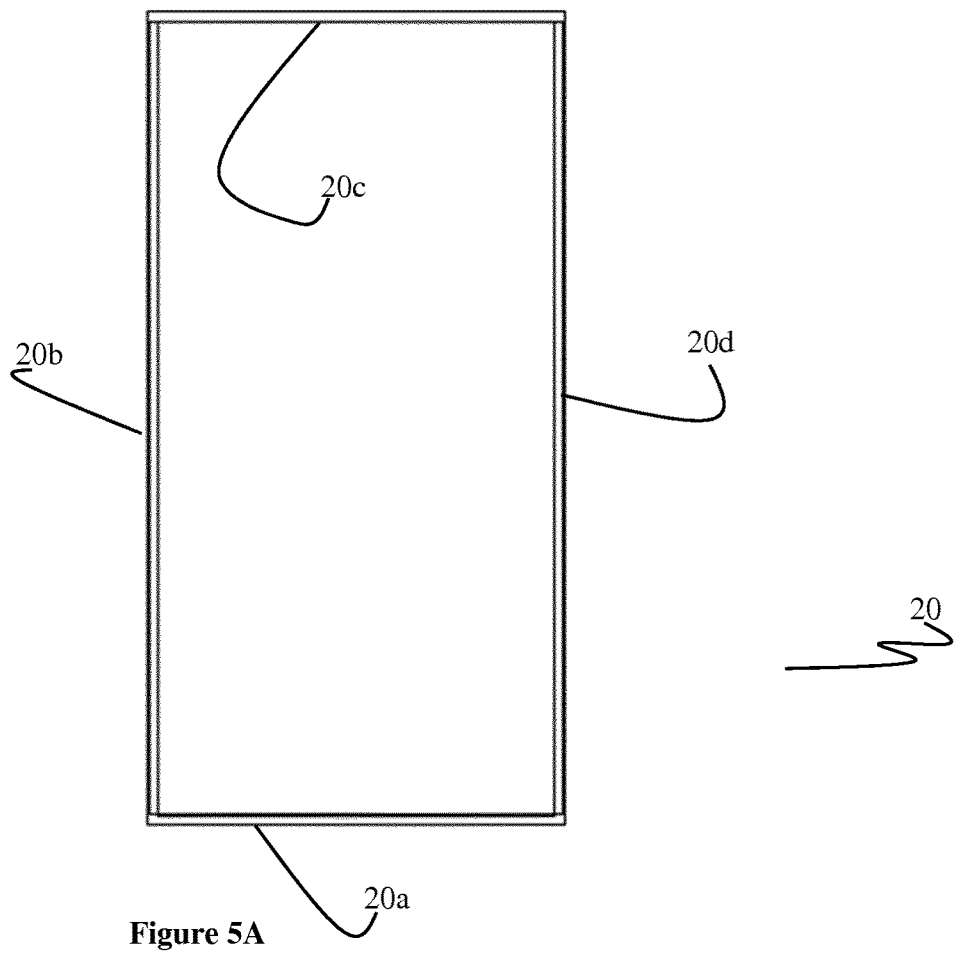
FIG. 5A and FIG. 5B show a plan view and side elevation view of the modular collar that is attached to the top of the enclosed membrane module of the present invention or to the top of the uppermost membrane module in a stack.
Figure 5B:
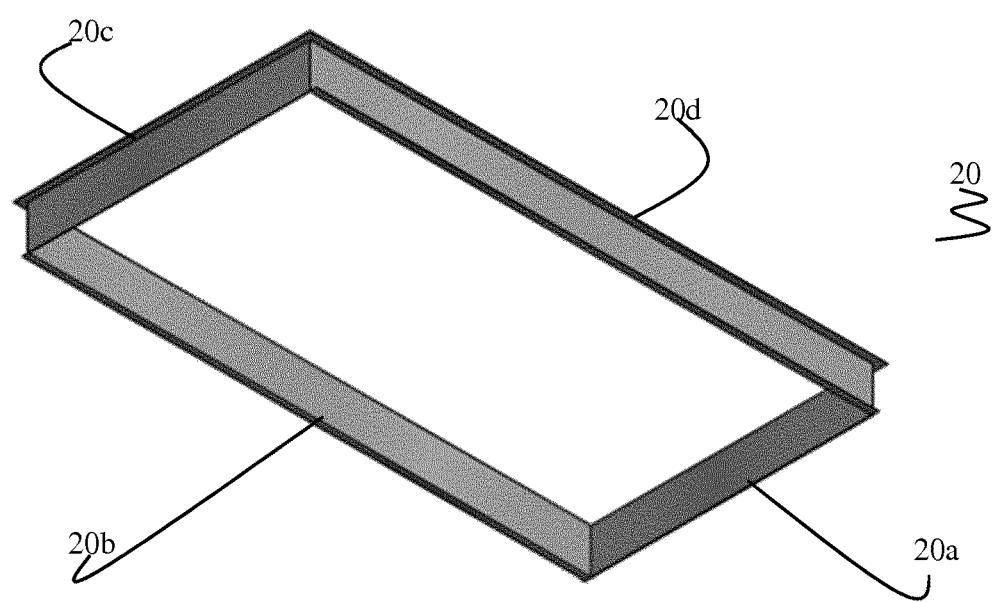

FIG. 5A and FIG. 5B show a plan view and side elevation view of the modular collar 20 that is attached to the top of the enclosed membrane module 1. The modular collar 20 comprises sides 21a, 21b, 21c, 21d and is configured to fit to a frame 110 of a membrane module 120 or to the top of an enclosed membrane module 1, thus providing an upper headspace 104 with an increased height when compared to upper headspace 104 without a modular collar 20 in place. When in use, the modular collar 20 is configured to separate the ports 11 and 12.

Figure 6A:
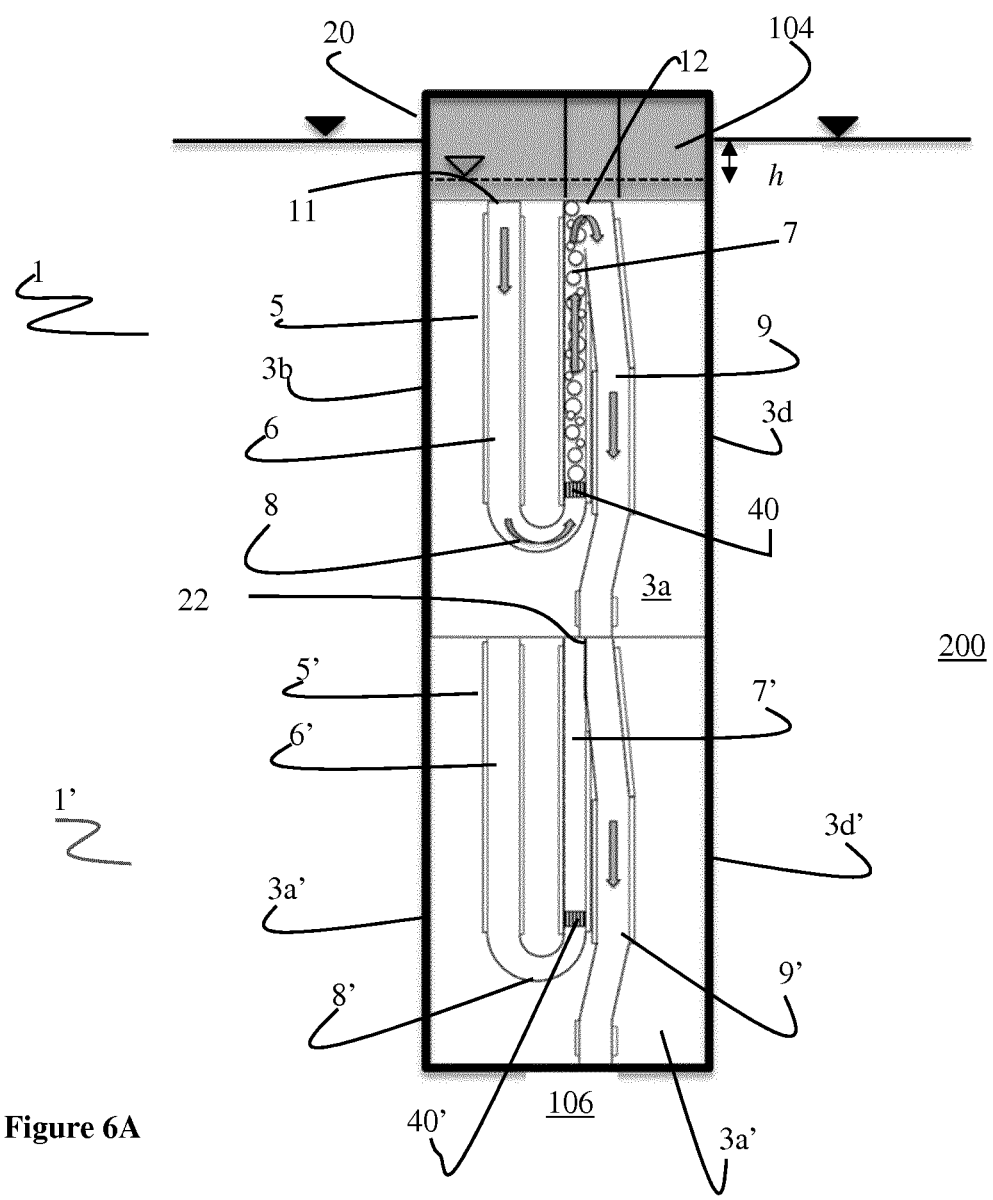
FIG. 6A and FIG. 6B illustrate how the enclosed membrane modules of the present invention may be stacked within a tank.
Figure 6B:
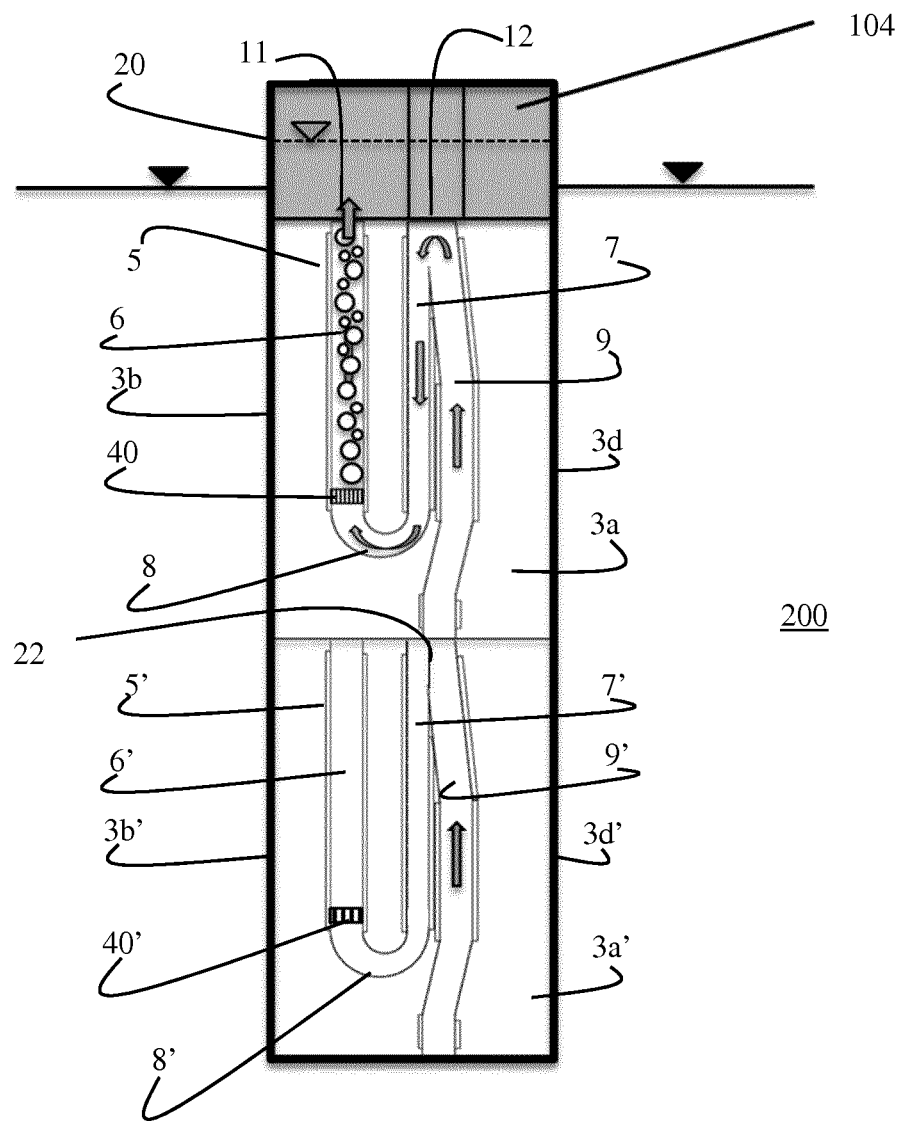

FIG. 6A and FIG. 6B illustrate how a number of enclosed membrane modules 1, 1' may be stacked one upon the other within a tank 200. The stacked enclosed membrane modules 1, 1' are configured such that the return channel 9 of module 1 connects to the return channel 9' of the module F. FIG. 6A and FIG. 6B are operating in the modes shown in FIGS. 4A and 4B, respectively. The substantially U-shaped tube 5' of module 1' is cut off by the insertion of a baffle 22 and remains unused. In the embodiment shown in FIG. 6A, the liquid level outside the modular collar 20 of the enclosed membrane module 1 is higher than the liquid level inside the modular collar 20, thus creating an upward velocity of liquid from the bottom of the tank 200 to the upper headspace 104 of the enclosed membrane module 1. In the embodiment show in FIG. 6B, the liquid level outside the modular collar 20 of the membrane module 1 is lower than the liquid level inside the modular collar 20, thus creating a downward velocity of liquid from the upper headspace 104 of the enclosed membrane module 1 to the bottom of the tank 200.

Figure 7A:
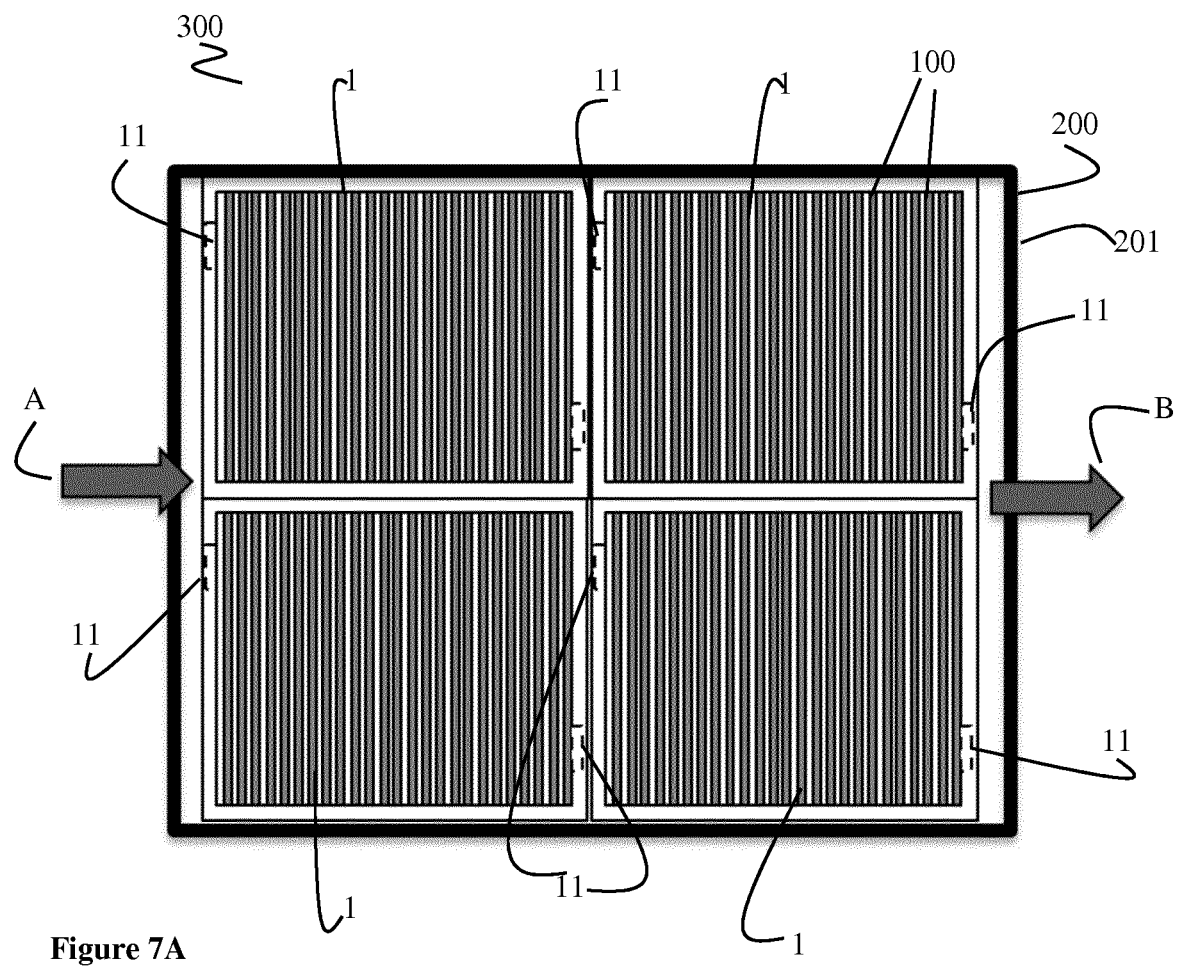
FIG. 7A and FIG. 7B illustrate a plan view and side view in cross section of four membrane modules each enclosed by a framing system of the present invention and which are installed in a tank. The whole treatment system makes up Membrane Aerated Biofilm Reactor which treats inlet wastewater and discharges a treated effluent.
Figure 7B:
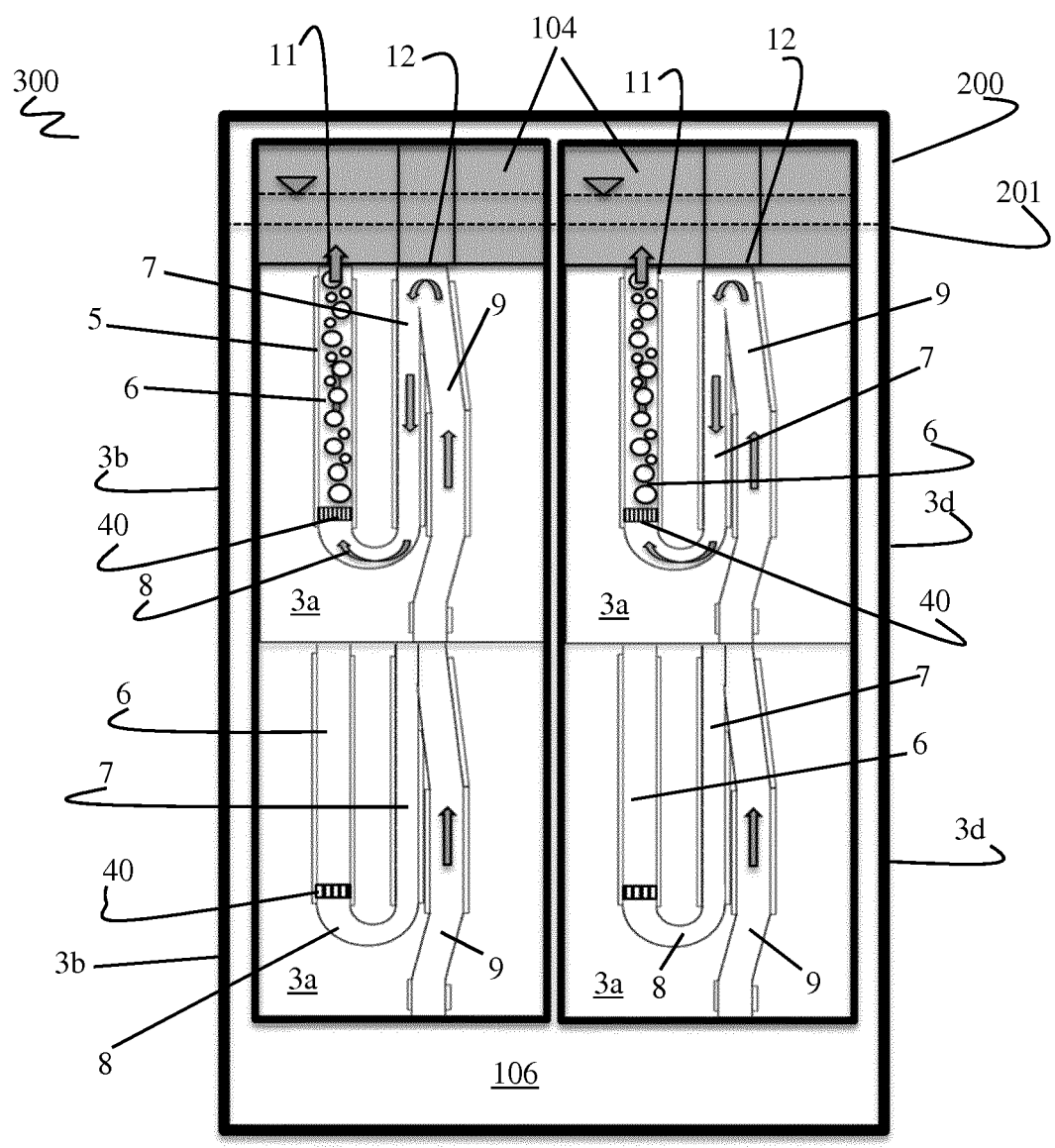

FIG. 7A and FIG. 7B illustrate a plan view and side view in cross section of four enclosed membrane modules 1, which are installed in a tank 200 to form a treatment system 300. The whole treatment system 300 makes up a MABR, which treats inlet wastewater and discharges a treated effluent. The treatment system 300 comprises the tank 200 having a housing 201 and a series of stacked enclosed membrane modules 1. In the embodiment show in FIG. 7B, the liquid level outside the modular collar 20 in the tank 200 is lower than the liquid level inside the modular collar 20 (indicated by the h mm), thus creating a downward velocity of liquid from the upper manifold 104 of the enclosed membrane module 1 to the bottom of the tank 200.

In FIGS. 7A and 7B, liquid (water or wastewater (effluent)) enters the system 300 via an inlet waste pipe A and the treated effluent exits the system 300 via outlet B. The liquid is treated by interacting with the cassettes 100 of the enclosed membrane modules 1. The airlift mixing system 4 provides a low-pressure, low-energy mixing system that ensures there is effective contact between as much of the membrane-attached pollutant-degrading biofilm that accumulates on the membranes 102 and the pollutant-rich wastewater to be treated. Generally, the enclosed membrane module 1 is designed to operate with gas pressures inside the hollow membrane fibres 102 which may be higher or lower than the external hydrostatic pressure of the tank 200.

Figure 8:
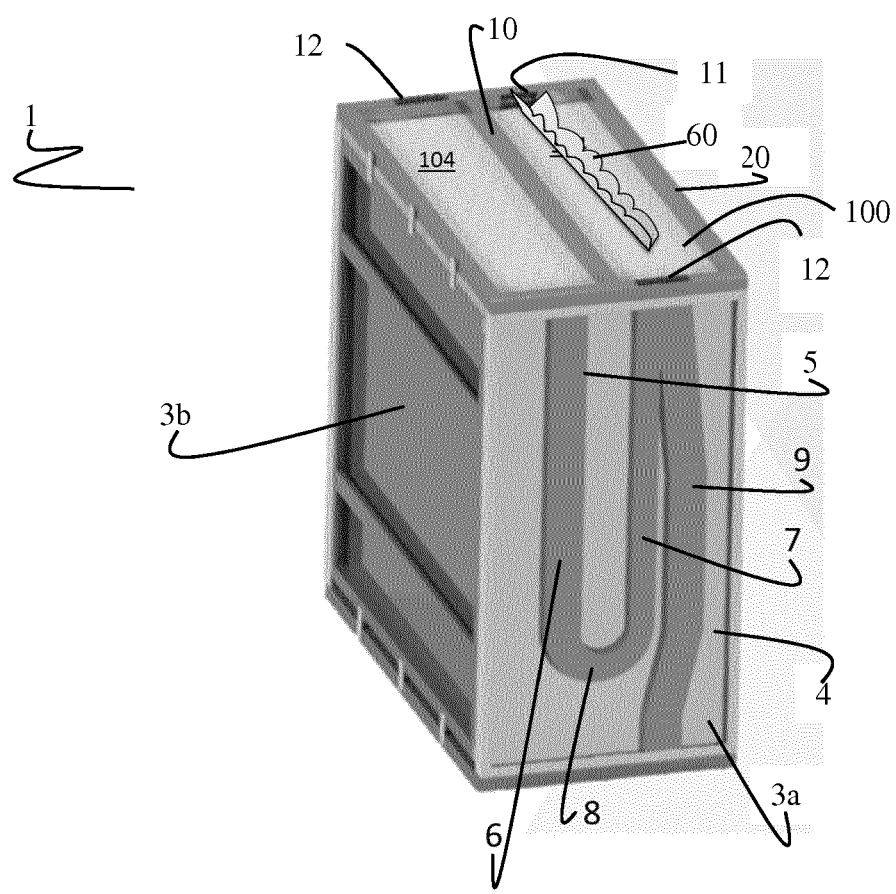
FIG. 8 illustrates an enclosed membrane module with a liquid flow distribution means in situ in the upper headspace 104 of the enclosed membrane module.

In FIG. 8, the enclosed membrane module 1 is illustrated with a liquid flow distribution means 60 is shown in situ in the upper headspace 104 of the enclosed membrane module 1. Generally, the water flow distribution means 60 is in fluid communication with port 12 and is configured to ensure uniform flow through the enclosed membrane module 1, that is the velocity of the flow of liquid within the module is equal on a horizontal plane. The provision of a uniform liquid flow through the enclosed membrane module 1 ensures an even upflow liquid velocity throughout the membrane module 1 and prevents short circuiting of the liquid between the port 12 and bottom of the return channel 9. The uniform velocity ensures that all of the membrane supported biofilm is contacted by the wastewater and removes the creation of a dead zone or poorly mixed regions where no flow occurs.

Figure 9:
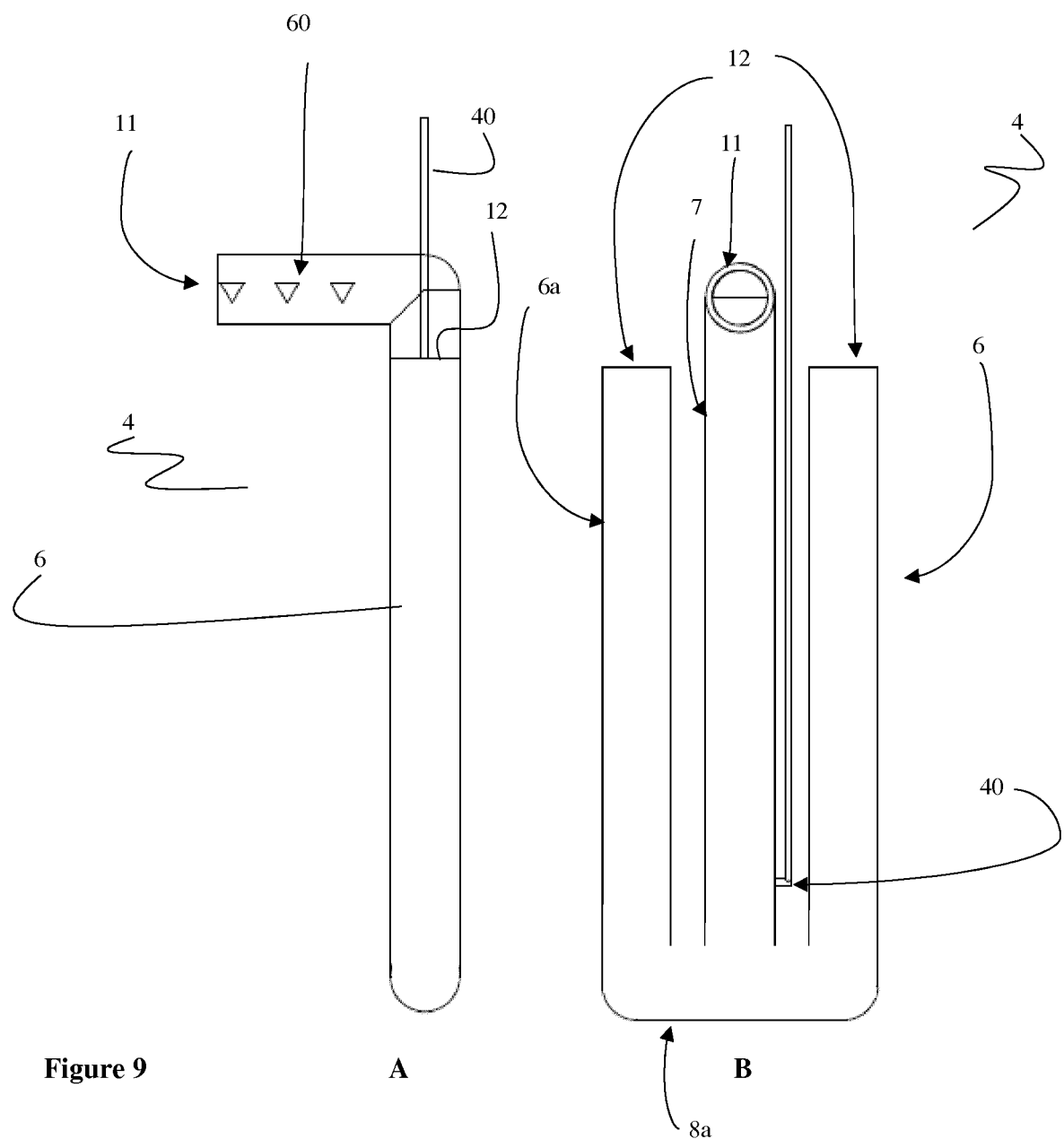
FIGS. 9A and 9B illustrate a side and front view of an airlift mixing system of the present invention, wherein the airlift mixing system is a substantially W-shape.
FIG. 9C illustrates the substantially W-shaped airlift mixing system in an enclosed membrane module of the present invention.
Figure 9C:
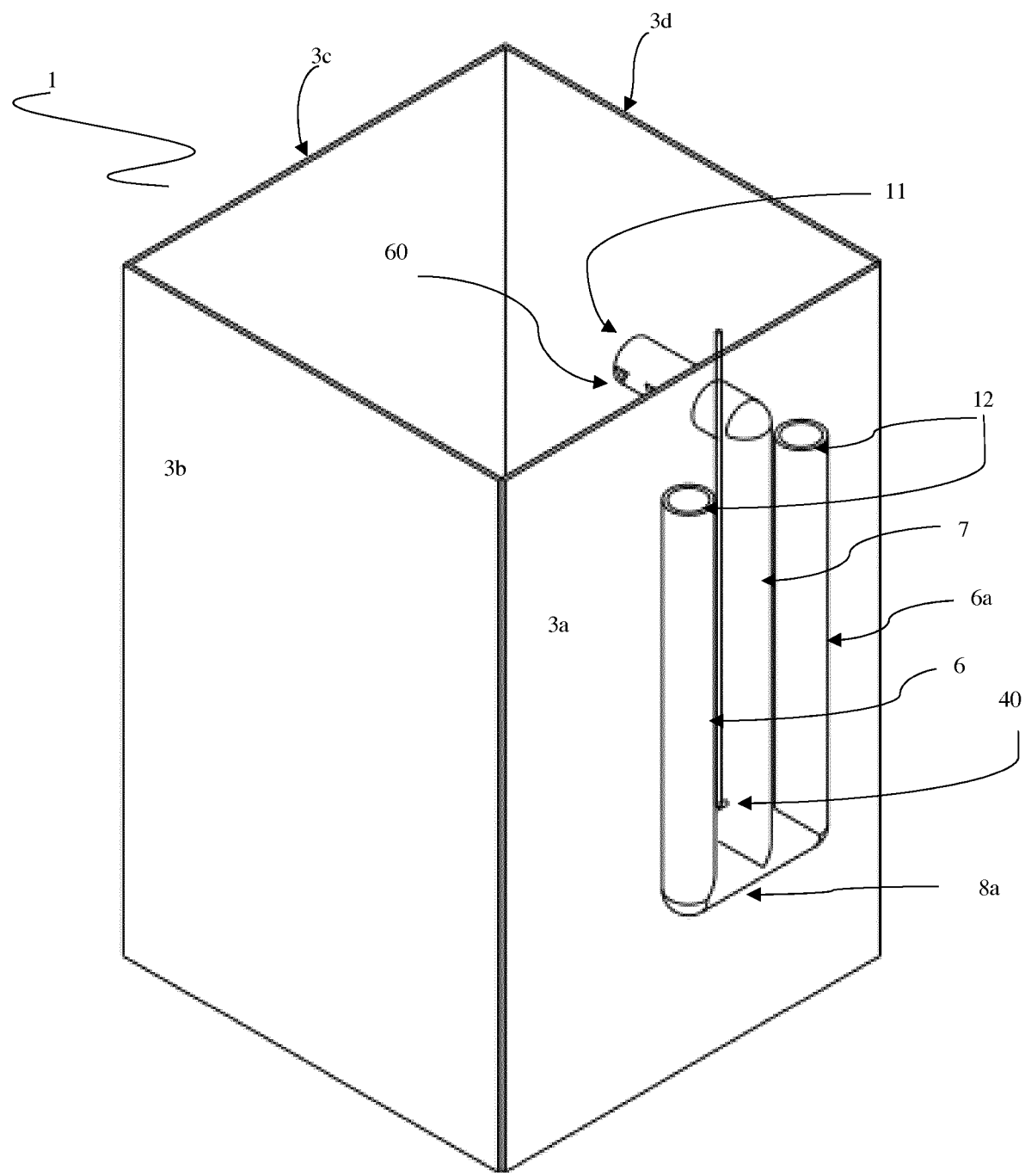

In FIG. 9A-C, the airlift mixing system 4 is shown to contain a second downcomer 6a giving the airlift mixing system 4 a substantially W-shape, where the central vertical channel is the air-lift channel 7 in fluid communication with the first downcomer 6 and second downcomer 6a on either side thereof. The air is delivered into the central airlift channel 7 at the air injection port 40, while the vertical channels, the first and second downcomer 6, 6a, are connected to the air lift channel 7 by a common water manifold 8a along the bottom, thus forming a substantially W-shape tube 50. Due to the water and air mixture flowing upwards through the central vertical channel 7, a downward waterflow is induced in both the first and second downcomer 6, 6a. Due to the presence of the panels 3a, 3b, 3c, 3d (see FIG. 9C), which extend beyond the surface of the liquid, the liquid discharged through the port 11 and the flow distribution means 60, originating from the airlift channel 7, must flow vertically downward and out of the enclosed membrane module 1 through the open bottom. One of the advantages of the W-shaped mixing system is that there are two inlets to the downcomers in this configuration and liquid can be introduced into the W-Shaped mixing system from two different points in tank. In the preferred configuration if the flow of liquid in the W-shaped tube is to be reversed, then air must be introduced into both vertical channels either side of the central vertical channel to make sure both of the side vertical channels become airlift channels and the central vertical channel becomes the downcomer. The W-shaped airlift mixing system can also be stacked as shown in FIG. 6A and FIG. 6B, one or two vertical return channels can also be installed on either side of the W-shaped mixing system. The W-shaped mixing system is easy to retrofit to existing modules, and can provide for larger area for flow using vertical channels with a smaller cross section.

One of the advantages of the invention is that the enclosed membrane module both protects the membranes from damage during transit and incorporates a low-pressure airlift system to encourage good liquid flow through the membrane module when the modules are installed in a bioreactor. This means that the effectiveness of the MABR when installed into a large tank is not dependant on the tank mixing, but is independently controlled via the liquid velocity in the enclosed membrane module. Such independent control allows successful installation in tanks of varying depth and shape or which were previously designed for different purposes, e.g. settling tanks, can be upgraded to incorporate the MABR without the need for an installation of an independent mixing system.

In the specification, the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An enclosure system for use with a membrane module (120) in membrane supported biofilm reactors, the membrane module (120) of the type having an upper and lower headspace (104,106) separated by an array of gas-permeable hollow fibre membrane cassettes (100) secured in parallel in the module (120), wherein the cassettes (100) are a linear arrangement of potted hollow fibre membranes, comprising an upper and lower manifold (98,99) into which are potted a large number of hollow fibre membranes or a number of bunches of hollow fibre membranes (102), characterised in that the enclosure system comprises:

(i) a plurality of panels (3a,3b,3c,3d) configured to seal the membrane module (120) to form an enclosed membrane module (1) which is open at the top and bottom but which is encased within the enclosure system;

(ii) a modular collar (20) configured to attach vertically to the enclosed membrane module (1), increasing height of the upper headspace (104); and (iii) a low-pressure airlift mixing system (4), which is integrated into at least one panel of said plurality of panels (3a,3b,3c,3d), which is configured to transport liquid either from inside the membrane module (120) to outside of the membrane module (120), or vice versa, so that liquid is pumped in an upward or downward direction through the enclosed membrane module (1), to encourage good liquid flow through the enclosed membrane module (120) when it is installed in a bioreactor or tank (200), wherein the airlift mixing system (4) comprises:

an airlift channel (7) and a first downcomer (6), which are in fluid communication with each other at their bottom, forming two sides of a substantially U-shaped tube (5) which is open at both ends;

a vertical return channel (9) having its top in fluid communication with the top of the substantially U-shaped tube (5) proximal the vertical return channel (9); and an air injection port (40) configured to accept and deliver air into a base of the airlift channel (7) to induce upward flow of liquid above the air injection port (40) in the airlift channel (7), causing a corresponding downward flow of liquid in the first downcomer (6); and wherein the open end of the U-shaped tube (5) distal the vertical return channel (7) forms a port (11) with access to inside the enclosed membrane module (1), the open end of the U-shaped tube (5) proximal the vertical return channel (7) forms a port (12) with access to outside of the enclosed membrane module (1) and the lower end of the vertical return channel (9) allows a fluid communication between the vertical return channel (9) and the bottom of said bioreactor or tank (200).

2. The enclosure system according to claim 1, in which the airlift mixing system further comprises a third vertical channel, giving the airlift mixing system a substantially W-shape, wherein the third vertical channel is a second downcomer (6a), and wherein one of the vertical channels is the air-lift channel (7), which is in fluid communication with the first and second downcomer (6,6a).

3. The enclosure system according to claim 1, in which the vertical return channel (9) is open to the environment outside of the enclosed membrane module (1) and configured to provide a continuous channel to supply water from one location within the bioreactor or tank (200), or another holding tank or compartment within a treatment system.

4. The enclosure system according to claim 2, in which the first and second downcomer (6,6a) is in fluid communication with liquid outside the enclosed membrane module (1) and the airlift channel (7) is in fluid communication with liquid inside of the enclosed membrane module (1).

5. The enclosure system according to claim 1, in which the air that is supplied to the airlift channel (7) is sourced from either exhaust air from the membranes, supplemental air from an external source, or both.

6. The enclosure system according to claim 1, in which the air injection port (40) is configured to release air continuously, in a pulsed or periodic manner, or a combination of both.

7. The enclosure system according to claim 1, in which the air injection port (40) is connected to an air syphon configured to allow air to accumulate and be released periodically to the air injection port (40).

8. The enclosure system according to claim 1, in which the air injection port (40) is configured to introduce air axially, radially, both axially and radially, or at an angle so as to induce turbulent water flow within the airlift channel (7).

9. The enclosure system according to claim 1, in which the air injection port (40) is 3.0 m or less below the liquid surface within the modular collar (20) of the enclosure system.

10. The enclosure system according to claim 1, in which the airlift mixing system (4) is configured to control the level of liquid within the enclosed membrane module (1) relative to the level of liquid outside the enclosed membrane module (1).

11. The enclosure system according to claim 1, in which at least one panel (3a,3b,3c,3d) in a four-sided enclosed membrane module (1) is configured to each accommodate the airlift mixing system (4).

12. The enclosure system according to claim 1, in which at least two, three or all panels in a four-sided enclosed membrane module are each configured to accommodate the airlift mixing system.

13. The enclosure system according to claim 1, further comprising a liquid flow distribution means in the headspace of the enclosed membrane module configured to provide uniform liquid flow through the enclosed membrane module (1).

14. The enclosure system according to claim 1, in which the enclosure system is modular, and where a plurality of enclosed membrane modules (1) can be stacked one on top of the other.

15. The enclosure system according to claim 1, in which the lower gas manifold (99) can be purged of liquid that may accumulate as a result of condensation or leakage.

16. The enclosure system according to claim 15, in which a high air flow rate is delivered to the lower manifold (99) either by increasing the airflow through the membranes, or by supplemental air supplied directly to the lower manifold (99), or a combination of both, so as to transport the accumulated liquid to either the airlift mixing system (4) or to the liquid surface.

* * * * *